(12) United States Patent  
Kamakura

(10) Patent No.: US 9,989,771 B2
(45) Date of Patent: Jun. 5, 2018

(54) HEAD MOUNTED IMAGE DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days. days.

(21) Appl. No.: 15/419,580

(22) Filed: Jan. 30, 2017

(65) Prior Publication Data

US 2017/0235148 A1 Aug. 17, 2017

(30) Foreign Application Priority Data

Feb. 15, 2016 (JP) ................. 2016-026429

(51) Int. Cl.
| | |
|---|---|
| *G02B 27/14* | (2006.01) |
| *G02B 27/01* | (2006.01) |
| *G02C 5/12* | (2006.01) |
| *G02C 5/14* | (2006.01) |
| *G02C 7/16* | (2006.01) |
| *G02C 11/00* | (2006.01) |

(52) U.S. Cl.
CPC ......... *G02B 27/0176* (2013.01); *G02C 5/126* (2013.01); *G02C 5/146* (2013.01); *G02C 7/16* (2013.01); *G02C 11/10* (2013.01); *G02B 2027/0152* (2013.01); *G02B 2027/0154* (2013.01); *G02B 2027/0156* (2013.01); *G02B 2027/0178* (2013.01); *G02C 2200/08* (2013.01)

(58) Field of Classification Search
CPC ........ G02B 27/0172; G02B 2027/0178; G02B 27/0176; G02B 2027/0118; G02B 27/0101
USPC .................................................. 359/630–639
See application file for complete search history.

(56) References Cited

U.S. PATENT DOCUMENTS

| | | | |
|---|---|---|---|
| 8,237,626 B2* | 8/2012 | Ishino .................. | G02B 27/017 345/8 |
| 2006/0070168 A1* | 4/2006 | Nakabayashi ..... | G02B 27/0176 2/171 |
| 2010/0073262 A1* | 3/2010 | Matsumoto ........ | G02B 27/0176 345/8 |
| 2015/0042544 A1 | 2/2015 | Sugihara et al. | |
| 2015/0212329 A1 | 7/2015 | Sugihara et al. | |

FOREIGN PATENT DOCUMENTS

| | | |
|---|---|---|
| JP | 2013-242421 A | 12/2013 |
| JP | 2014-086905 A | 5/2014 |

* cited by examiner

*Primary Examiner* — Mohammed Hasan
(74) *Attorney, Agent, or Firm* — Oliff PLC

(57) ABSTRACT

A head mounted image display apparatus including a display section that displays an image, a frame member that supports the display section, and a mounting member that is supported by one end of the frame member and allows the frame member to be mounted on a user's head, wherein the frame member has, at the one end, a first support section that supports the mounting member and a second support section that supports the mounting member in a support scheme different from a support scheme in accordance with which the first support member supports the mounting member.

8 Claims, 24 Drawing Sheets

HEAD MOUNTED IMAGE DISPLAY APPARATUS

BACKGROUND

1. Technical Field

The present invention relates to a head mounted image display apparatus.

2. Related Art

There is a known head mounted image display apparatus or what is called a head mounted display (HMD) of related art that is mounted on a user's head and displays an image visually recognizable by the user. As a head mounted display of this type, there is a known wearable apparatus having the shape of glasses and configured to allow the temples to be replaced (see JP-A-2013-242421, for example).

The wearable apparatus having the shape of glasses described in JP-A-2013-242421 includes a front section, a first temple section, a second temple section, and a display apparatus. The front section corresponds to the rim or the bridge of glasses and is disposed in front of the face of the user on whom the wearable apparatus is mounted. The first temple section and the second temple section correspond to the "bows" of glasses and are disposed along one temporal region and the other temporal region of the user on whom the wearable apparatus is mounted. The two temple sections are so configured that the first temple section accommodates the display apparatus, which enlarges a display image and allows the user to view the enlarged image in the form of a virtual image and the second temple section is provided with a battery.

In the wearable apparatus having the shape of glasses, the first and second temple sections are attachable to and detachable from the front section, and the front section is configured to allow the first and second temple sections to be swapped. Specifically, the front section has a first connection section to which the first and second temple sections can be connected and a second connection section to which the first and second temple sections can also be connected, and each of the connection sections is provided with a plurality of terminals. Each of the temple sections has a plurality of terminal, whereby the wearable apparatus having the shape of glasses is configured to be capable of determining which temple section is connected to which connection section on the basis of the state of connection of the terminals of the temple sections to the terminals of the connection sections.

Therefore, both in a case where the first temple section is disposed on the right side and the second temple section is disposed on the left side and in a case where the second temple section is disposed on the right side and the first temple section is disposed on the left side, the display section and the battery are connected to the temple sections via connection lines, and a display image can be displayed on the side where the display apparatus is disposed. Therefore, in the wearable apparatus having the shape of glasses described above, the position where a display image is displayed can be changed in accordance with the user's request and preference.

In recent years, applications of an HMD and environments where an HMD is used are expanding, and replacement of the temple sections in accordance with the applications and use environments is conceivable.

However, in the case where an HMD has a configuration in which the temple sections are connected to the front section in one direction, as in the case of the wearable apparatus having the shape of glasses described in JP-A-2013-242421, connection of larger, heavier temple sections possibly to the front section possibly results in deformation of the front section due to the load produced by the connection of the temple sections and acting on the front section. To avoid the problem, increasing the thickness of the front section to increase the strength thereof undesirably results in an increase in the weight and hence a decrease in mounting sensation.

SUMMARY

An advantage of some aspects of the invention is to provide a head mounted image display apparatus to which different mounting members can be attached in a stable manner.

A head mounted image display apparatus according to an aspect of the invention includes a display section that displays an image, a frame member that supports the display section, and a mounting member that is supported by one end of the frame member and allows the frame member to be mounted on a user's head, and the frame member has, at the one end, a first support section that supports the mounting member and a second support section that supports the mounting member in a support scheme different from a support scheme in accordance with which the first support member supports the mounting member.

The state in which the mounting scheme is different refers to at least one of the following states: Mounting members are attached to the first and second support sections in different directions; different mounting members are attached to the first and second support sections; mounting member are attached to the first and second support sections in different methods; mounting members are supported by the first and second support sections in different states (for example, mounting members are movable or fixed).

According to the aspect described above, in accordance with the structure and the weight of a mounting member, a support section to which the mounting member is attached can be selected from the first support section and the second support section for use. Therefore, for example, a support section capable of resisting the load applied when the mounting member is mounted can be selected from the first support section and the second support section for use to attach the mounting member to the frame member in a stable manner. Different mounting members can therefore be attached to the frame member in a stable manner. In addition to the above, a plurality of types of mounting member can be attached to the frame member, whereby the versatility of the head mounted image display apparatus can be enhanced.

Further, in accordance with the shape, configuration, and other factors of a mounting member, a support section to which the mounting member is relatively readily attached is selected from the first support section and the second support section for use, whereby the mounting member can be readily attached to the frame member. Therefore, in this case, the attachment of the mounting member can be simplified.

In the aspect described above, it is preferable that the mounting member is movably supported by the first support section, and that the mounting member is fixed to the second support section.

The state in which the mounting member is movable can, for example, be a state in which the mounting member pivots around the first support section and a state in which the mounting member along with the first support section is allowed to slide.

The configuration described above allows a mounting member according to an application of the head mounted image display apparatus as well as the configuration of the mounting member can be attached to a support section according to the application. The versatility of the head mounted image display apparatus can therefore be enhanced.

In the aspect described above, it is preferable that the second support section is located in a position close to the first support section.

The configuration described above allows the size of the portion of the frame member where the first support section and the second support section are disposed can be reduced. The size of the head mounted image display apparatus can therefore be reduced.

In the aspect described above, it is preferable that the first support section supports the mounting member with a first attaching section that attaches the mounting member fixed along a first direction, and that the second support sections support the mounting member with a second attaching section that attaches the mounting member fixed along a second direction different from the first direction.

According to the configuration described above, the first support section supports the mounting member with the first attaching section fixed along the first direction, and the second support section supports the mounting member with the second attaching section fixed along the second direction different from the first direction. As a result, one of the first attaching section and the second attaching section, which are fixed along the directions different from each other, allows the corresponding support section to support the mounting member. Therefore, in accordance with the structure and other factors of mounting member, the mounting member can be reliably attached to the first support section or the second support section.

In the aspect described above, it is preferable that the second direction is a direction along an extending direction of the mounting member attached to the frame member from the frame member, and that support sections that form the second support section are located in the frame member and in positions that sandwich the first support section in a direction perpendicular to the extending direction.

According to the configuration described above, the support sections that form the second support section are located in positions that sandwich the first support section, whereby the first and second support sections can be closely arranged. The size of the portion of the frame member where the support sections are located can therefore be reliably reduced. The size of the head mounted image display apparatus can therefore be reduced.

In a case where the second attaching section is a screw, and if the second support section is formed of one support section, the mounting member is likely to undesirably pivot. In contrast, the second support section is formed of at least two support sections, whereby pivotal motion of the mounting member can be avoided. The mounting member can therefore be attached in a more stable manner.

In the aspect described above, it is preferable that the head mounted image display apparatus further includes a case member attached to the one end of the frame member, the case member includes an upper case located in an upper position and a lower case located in a lower position and combined with the upper case, and the second attaching section attaches the mounting member and at least one of the upper case and the lower case to the second support section.

The configuration described above eliminates the necessity to separately provide a configuration for attaching at least one of the upper case and the lower case to the frame member. Complication of the configurations of the frame member and the case member can therefore be avoided.

In a case where the second support section is formed of a plurality of support sections, at least one of the support sections that form the second support section can be used as the configuration for fixing the upper case and the other one of the support sections that form the second support section can be used as the configuration for fixing the lower case. Complication of the configuration of the frame member to which the case member is attached can therefore be reliably avoided.

In the aspect described above, it is preferable that the first attaching section is a fastener inserted through the mounting member along the first direction to attach the mounting member to the first support section, and that the second attaching section is a fastener inserted through the mounting member along the second direction to attach the mounting member to the second support section.

Each of the fasteners described above can, for example, be a screw.

According to the configuration described above, since each of the first attaching section and the second attaching section is a fastener inserted through the mounting member and attached to the first support section or the second support section, the mounting member can be reliably attached to the first support section or the second support section. The mounting member can therefore be reliably attached to the frame member in a simple configuration.

In the aspect described above, it is preferable that the head mounted image display apparatus further includes a case member attached to the one end of the frame member, the first attaching section is a fastener inserted through the mounting member along a direction perpendicular to an extending direction of the mounting member attached to the frame member from the frame member to attach the mounting member to the first support section, the second support section is located inside the case member, and the second attaching section is a fastener inserted through the mounting member and the case member along the extending direction to attach the mounting member and the case member to the second support section.

According to the configuration described above, the second support section, to which the fastener inserted through the mounting member and the case member along the extending direction described above is attached, is located inside the case member. As a result, the second support section is less visible, and not only the mounting member but also the case member can be attached to the frame member via the second support section and the fastener attached to the second support section, as described above. The frame member therefore needs to be separately provided with no configuration for attaching the case member to the frame member, whereby the configuration of the frame member can be simplified.

Further, since the direction in which the fastener that is the first attaching section is inserted into the mounting member coincides with the direction perpendicular to the extending direction described above, the mounting member can be so attached to the first support section as to be allowed to pivot around the insertion direction. Therefore, in a case where the direction perpendicular to the extending direction coincides with the upward/downward direction with respect to the user on whom the head mounted image display apparatus is mounted, the mounting member can be folded toward the user side. The head mounted image display apparatus can therefore be readily handled.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Exterior Configuration of HMD

Figure 1:
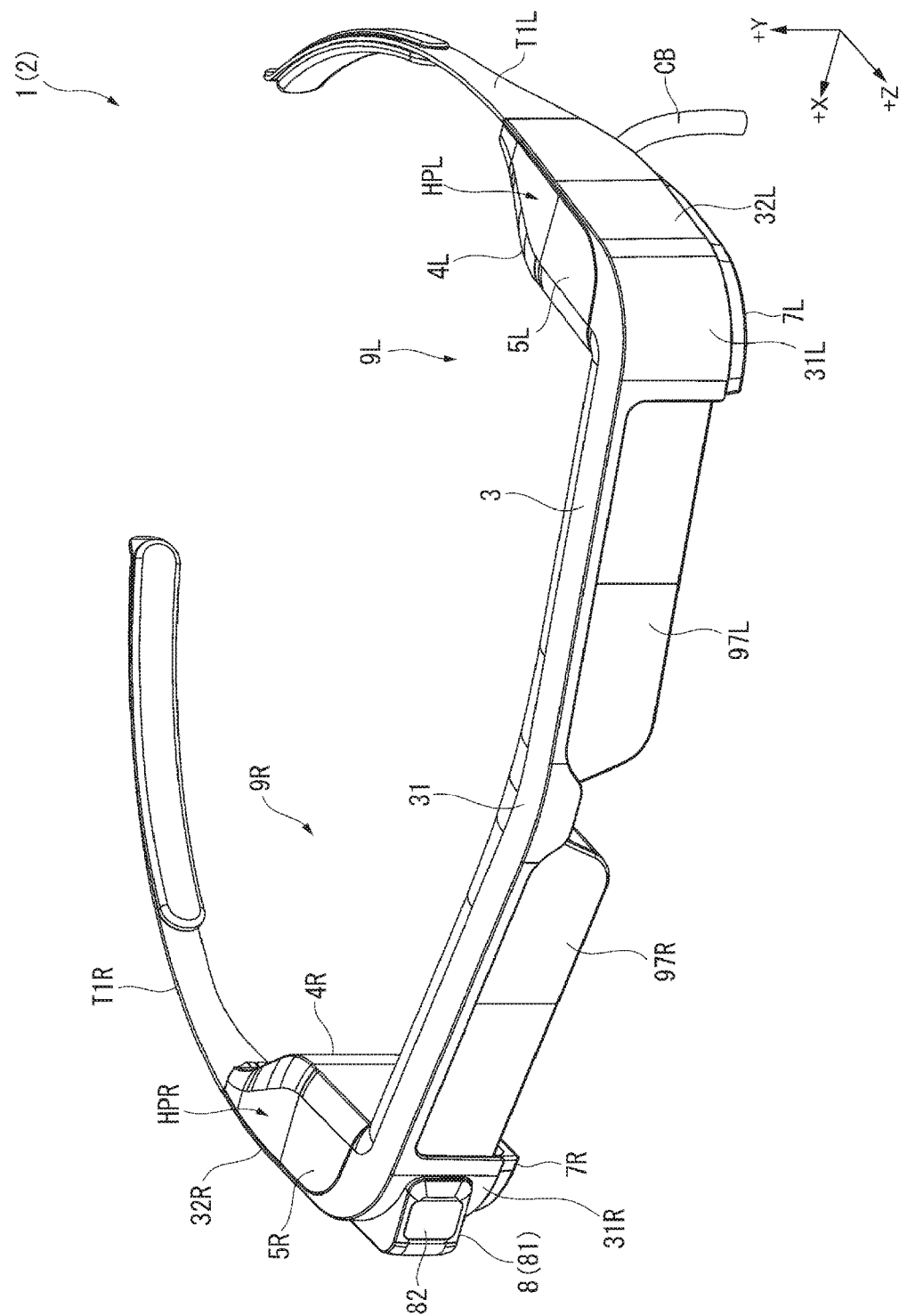
FIG. 1 is a perspective view showing an HMD according to an embodiment of the invention.
Figure 2:
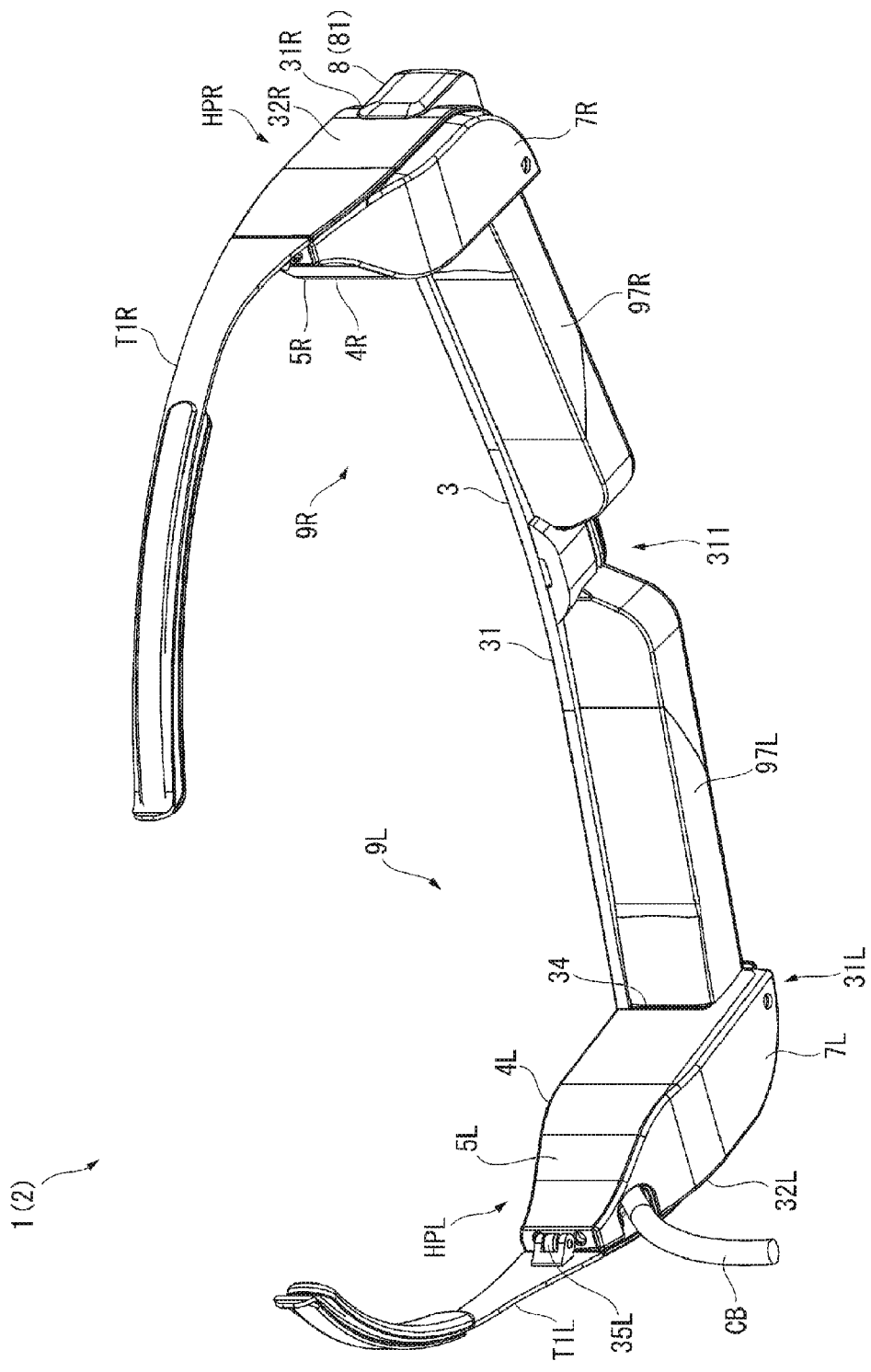
FIG. 2 is a perspective view showing the HMD in the embodiment.
Figure 3:
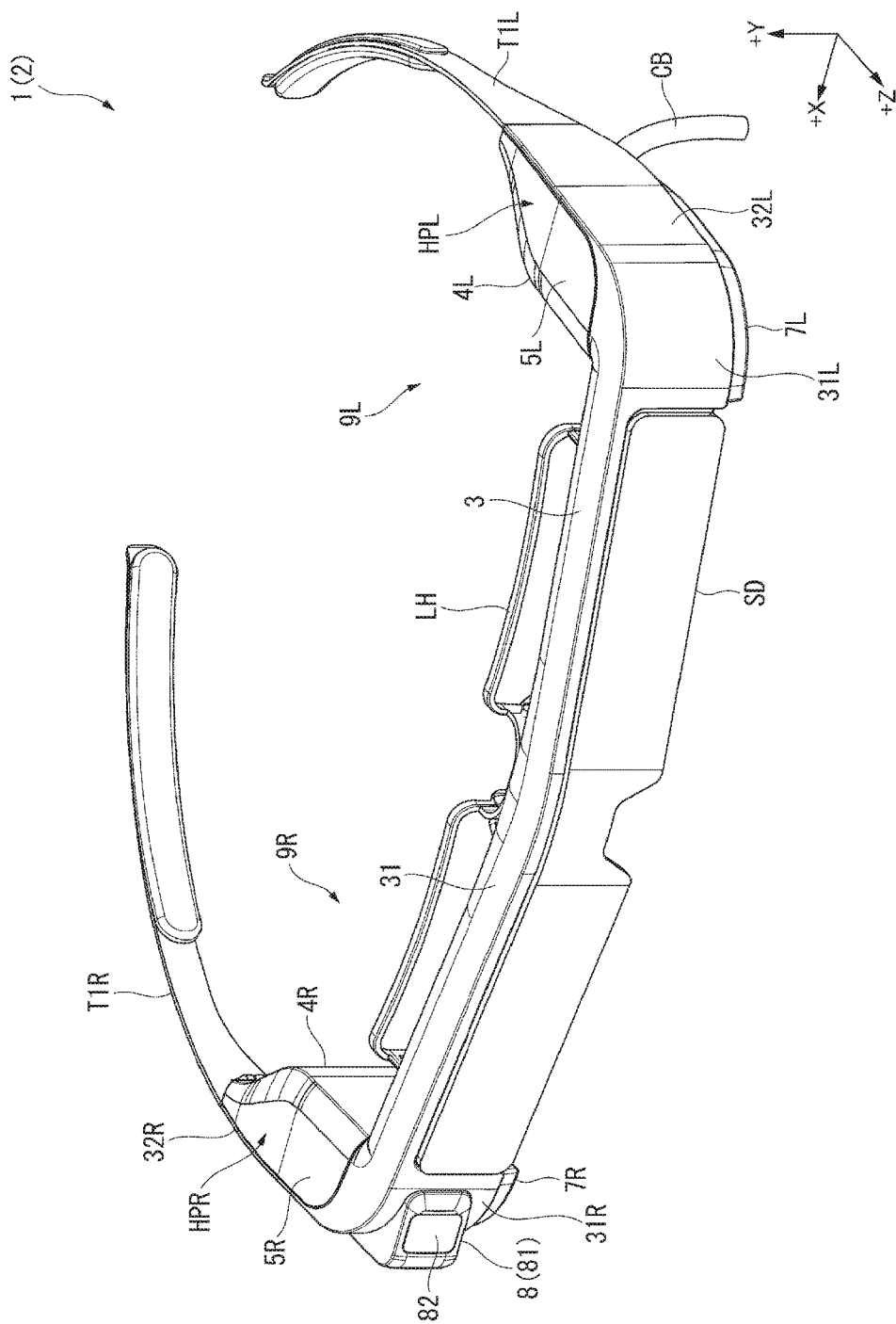
FIG. 3 is a perspective view showing the HMD on which a lens holder and a light shielding member are mounted in the embodiment.
Figure 4:
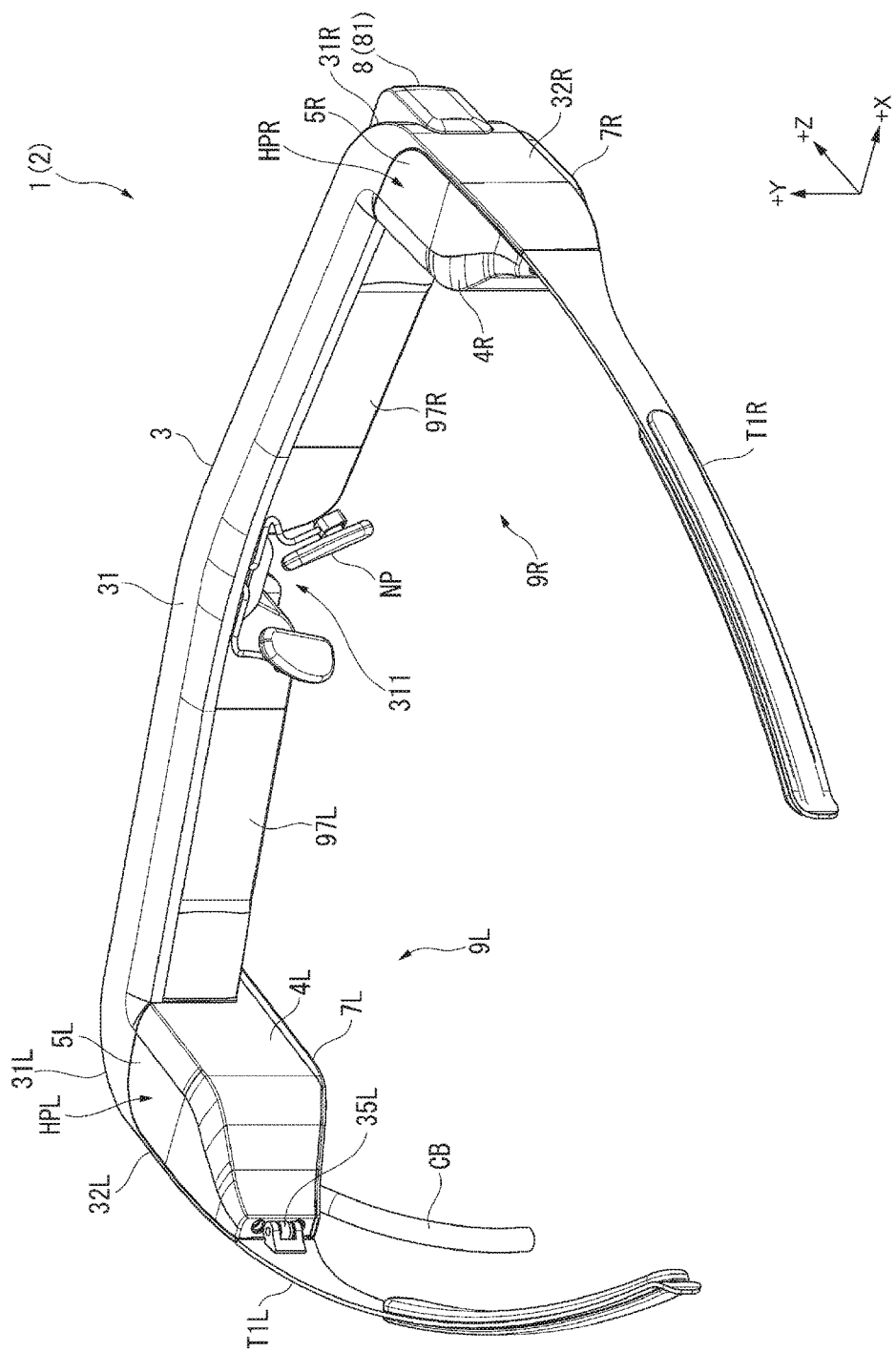
FIG. 4 is a perspective view showing the HMD on which nose pads and the light shielding member are mounted in the embodiment.

FIGS. 1 to 4 are perspective views showing exterior appearances of an HMD 1 according to the present embodiment. In detail, FIGS. 1 and 3 are perspective views of the HMD 1 viewed from the front side and from above. FIG. 2 is a perspective view of the HMD 1 viewed from the rear side and from below. FIG. 4 is a perspective view of the HMD 1 viewed from the rear side and from above. FIG. 3 shows the HMD 1 on which a lens holder LH and a light shielding member SD are mounted. FIG. 4 shows the HMD on which nose pads NP and the light shielding member SD are mounted.

The HMD (head mounted display) 1 according to the present embodiment is a see-through-type head mounted image display apparatus that is mounted on a user's head for use, displays an image visually recognizable by the user, and transmits outside light to allow the user to view the outside. The HMD 1 includes a frame 2, and an imaging device 8 (FIG. 1) and two optical devices 9R and 9L, which are supported by the frame 2, as shown in FIGS. 1 to 4. In addition, the HMD 1 is so configured that the nose pads NP (FIG. 4), the lens holder LH (FIG. 3), and the light shielding member SD (FIG. 3) are attachable to and detachable from the frame 2.

The HMD 1 according to the present embodiment is partly characterized in that a plurality of types of mounting members can be mounted on the HMD 1. The characteristic will be described later in detail.

In the following description, in a case where the user on whom the HMD 1 is mounted is viewed from the front, the side viewed through the HMD 1 is called a front side (or frontward), and the side opposite the front side is called a rear side (or rearward). Further, the upper side and the lower side of the HMD 1 correspond to the upper side and the lower side of the user, and the right side and the left side of the HMD 1 correspond to the right side and the left side of the user on whom the HMD 1 is mounted.

In the following figures and description, a +X direction, a +Y direction, and a +Z direction perpendicular to one another are set as follows: The +Z direction is the direction from the rear side toward the front side; the +Y direction is the direction from the lower side toward the upper side; and +X direction is the direction from the left side toward the right side. Further, the direction opposite the +Z direction is called a −Z direction for ease of description. The same holds true for a −Y direction and a −X direction.

Configuration of Nose Pad

The nose pads NP are so provided as to be addable and removable from the rear side to and from a mounting section 311, which is located between light guide members 97R and 97L, which will be described later, in a frame body 3 as shown in FIG. 4. The nose pads NP sandwich the user's nose (portions corresponding to wings of nose) from right and left in the state in which the HMD 1 is mounted on the user to prevent the HMD 1 from shifting rightward, leftward, or downward.

Configuration of Lens Holder

The lens holder LH has the configuration of temple-less glasses, as shown in FIG. 3. The lens holder LH is so provided as to hold right and left lenses for eyesight correction (not shown) and as to be addable and removable from the rear side to and from the mounting section 311 described above.

Configuration of Light Shielding Member

The light shielding member SD is so attached to the mounting section 311 described above as to be attachable thereto and detachable therefrom in such a way that the light shielding member SD covers the light guide members 97R and 97L on the front side, which is the side opposite the nose pads NP and the lens holder LH described above via the light guide members 97R and 97L, as shown in FIG. 3. The light shielding member SD shields at least part of outside light incident on the light guide members 97R and 97L to make the outside less visible for improvement in visibility of a displayed image.

Schematic Configuration of Frame

The frame 2 has the configuration of the frame of glasses and supports the imaging device 8 and the optical devices 9R and 9L, and the nose pads NP, the lens holder LH, and the light shielding member SD described above are mounted on the frame 2, as described above, as shown in FIGS. 1 to 4. The frame 2 has a frame body 3, which has a roughly U-letter shape when viewed from above, case members 4R and 4L, which are attached to the frame body 3, and mounting members T1R and T1L, which are provided as part of the frame body 3.

Among the components described above, the right mounting member T1R and the left mounting member T1L are temples that are so placed on the user's ears as to support the HMD 1 and therefore allow the HMD 1 to be mounted on the user's head. The mounting members T1R and T1L are so connected to support sections 35R and 35L, which are provided as part of the frame body 3, as to be bendable toward the user. The mounting members T1R and T1L, when extended roughly in parallel to corresponding side surface sections 32R and 32L, can be placed on the user's right and left ears, whereby the HMD 1 can be mounted on the head. On the other hand, in a case where the HMD 1 is not mounted on the user, the mounting members T1R and T1L can be bent inward so that the mounting members T1R and T1L are folded.

Each of the mounting members T1R and T1L is formed of a plate into which an elastic member is fit, and the elastic member is made, for example, of rubber, has an H-shaped cross section, and has two exposed surfaces, a user-side surface and a surface opposite the user-side surface. The plate can be made of a synthetic resin or a metal, such as titanium. The elastic member is not necessarily configured as described above, and two elastic members may be glued to or fit into the user-side surface and the surface opposite the user-side surface of the plate, or one elastic member may be provided only on one of the surfaces.

The frame main body 3 has a front section 31, which extends along the user's forehead, and side surface sections 32R and 32L, which intersect the front section 31 and extend rearward (toward user's rear side) from the right and left ends of the front section 31 and therefore extend along the user's temples. The frame body 3 is a unitary molded part made of a metal and formed of the front section 31 and the side surface sections 32R and 32L integrated with each other.

The front section 31 is part of the frame body 3 and extends along the rightward/leftward direction. The front section 31, which corresponds to the support section according to an aspect of the invention, supports the light guide members 97R and 97L, which serve as a display section disposed in front of the user's right and left eyes, and further supports the nose pads NP, the lens holder LH, and the light shielding member SD via the mounting section 311 described above, which is located between the supported light guide members 97R and 97L. A left end section 31L and a right end section 31R of the front section 31 are curved rearward in an arcuate shape when viewed from above, and the imaging device 8, which will be described later, is disposed in the right end section 31R. The side surface section 32R extends rearward from the right end section 31R, and the side surface section 32L extends rearward from the left end section 31L.

The side surface section 32R is combined with the case member 4R to form an accommodation section HPR, which has an accommodation space S (FIGS. 7 and 8), which accommodates a right image projection section 91 and a right control section 96, which form the optical device 9R.

Similarly, the side surface section 32L is combined with the case member 4L to form an accommodation section HPL, which has an accommodation space S, which accommodates a left image projection section 91 and a left control section 96, which form the optical device 9L.

The side surface sections 32R and 32L and the case members 4R and 4 will be described later in detail.

Configuration of Imaging Device

The imaging device 8 is provided in the frame body 3, as shown in FIGS. 1 to 4. Specifically, the imaging device 8 is provided in the right end section 31R of the front section 31. The imaging device 8 includes an imaging section and a light emitting section fit into the right end section 31R and a cover 81, which is so attached to the outer surface of the frame body 3 as to cover the imaging section and the light emitting section.

Among the components described above, the cover 81 is made of a light transmissive resin and visually recognized as a shape in which the cover 81 having a cubic shape is buried in the right end section 31R described above.

The imaging section is so disposed that the imaging direction faces the front side and captures an image of an area in front of the user through a light transmissive member 82 attached to the cover 81.

The light emitting section is so disposed that light is emitted rightward. The light emitting section notifies the state of the action of the imaging device 8 and lights up during the period for which the imaging section performs imaging. When the light emitting section lights up, the light emitted from the light emitting section is visible from the outside through the cover 81.

The thus configured imaging device 8 is controlled by the control section 96 disposed in the accommodation section HPR and outputs a captured image to the control section 96. The light-up state of the light emitting section is also controlled by the control section 96.

If the light transmissive member 82, which functions as a protective cover, has a circular shape, the exterior appearance of the imaging device 8 looks indeed like the exterior appearance of a camera, possibly giving persons around the user of the apparatus a sense of unease and causing them to think that "a camera is aimed at them" even when the imaging section is not in operation. To lessen such a sense of unease, in the present embodiment, the light transmissive member 82 has a rectangular shape, which is unlikely to cause the persons around the user of the apparatus to take the imaging device 8 to be a camera. The light transmissive member 82 may be configured to function as a lens as long as the lens prevents water or dust from entering the imaging device 8 and further prevents the surface of the light transmissive member 82 from being scratched or otherwise damaged.

Configuration of Optical Device

Figure 5:
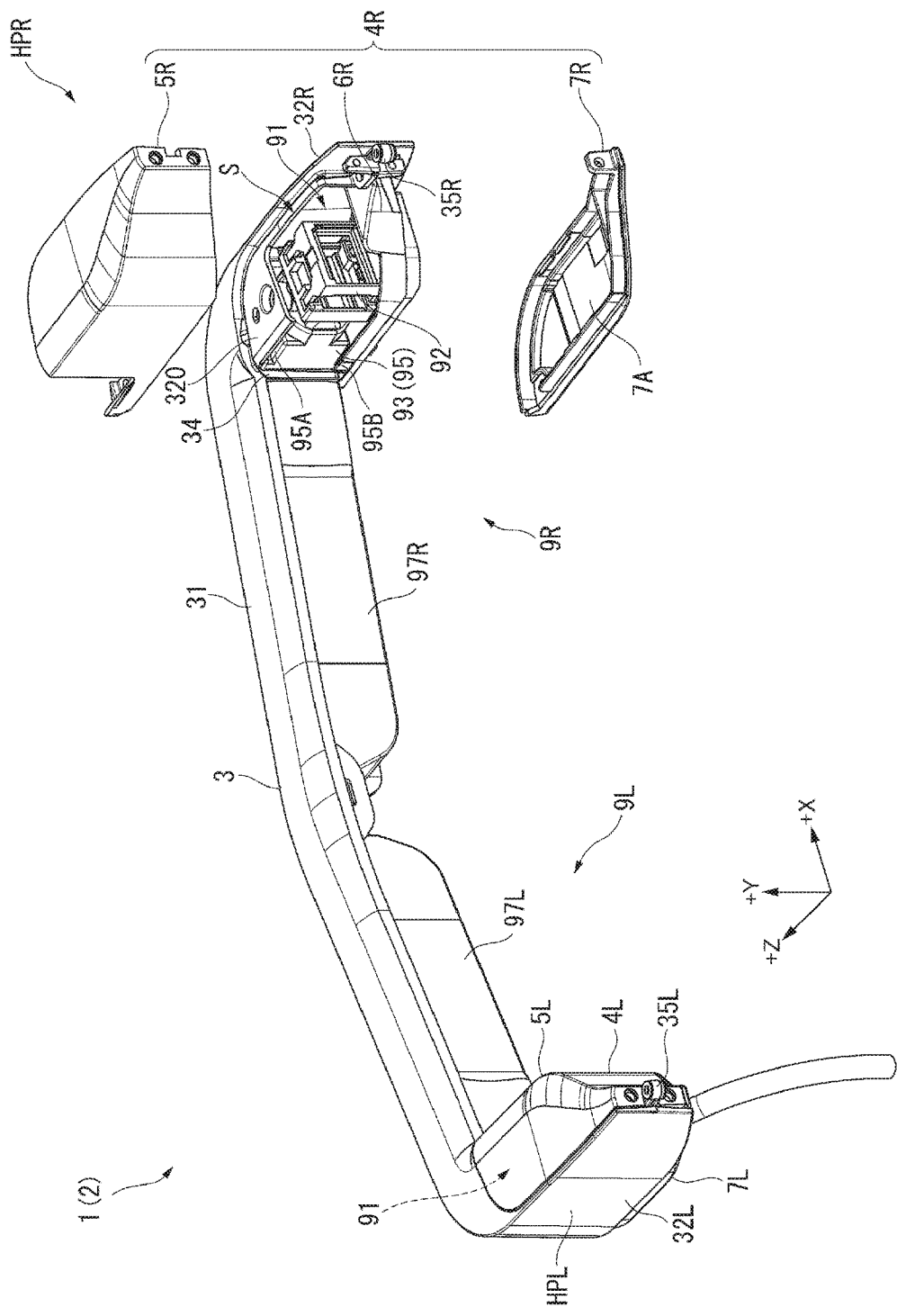
FIG. 5 is a perspective view showing the HMD with an upper case and a lower case removed in the embodiment.
Figure 6:
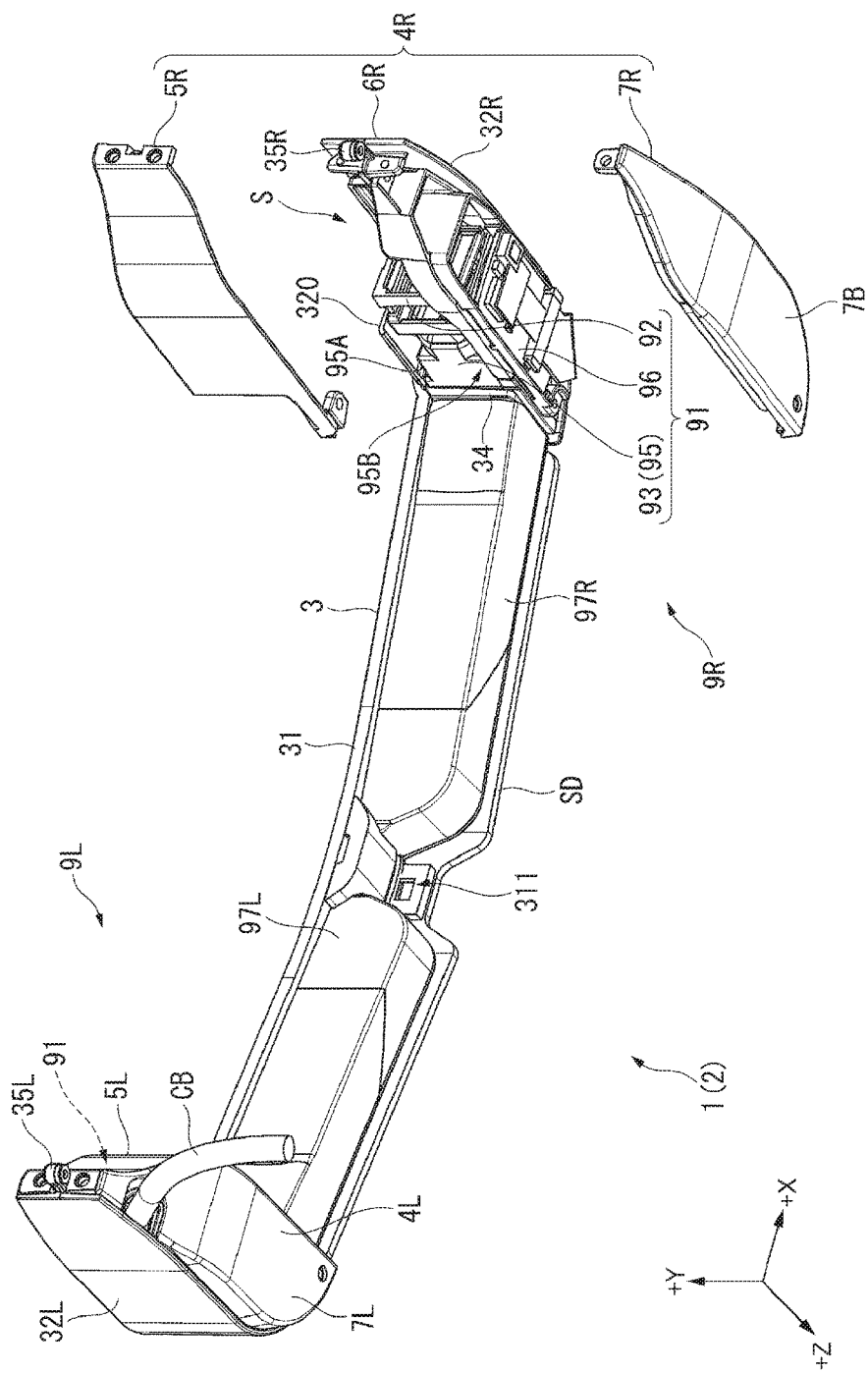
FIG. 6 is a perspective view showing the HMD with the upper case and the lower case removed in the embodiment.

FIGS. 5 and 6 are perspective views of the HMD 1 viewed from the rear side and from above and below, respectively, with an upper case 5R and a lower case 7R, which form the case member 4R, removed. In FIGS. 5 and 6, the mounting members T1R and T1L are omitted.

The optical device 9R is located on the right side of the frame 2, and the optical device 9L is located on the left side of the frame 2. The optical devices 9R and 9L display images according to an externally inputted image signal and visually recognizable by the user. Out of the two optical devices, the optical device 9R includes the image projection section 91 and the control section 96, which are disposed in the accommodation section HPR, which is the combination of the side surface section 32R and the case member 4R, and further includes the light guide member 97R, which is supported by the front section 31 described above, as shown in FIGS. 5 and 6.

The following description will be primarily made of the optical device 9R. It is, however, noted that the optical device 9L, which is a mirror-symmetric version of the optical device 9R, also includes the image projection section 91, the control section 96, and the light guide member 97L, which are the same as those in the optical device 9R.

Configuration of Image Projection Section

Figure 7:
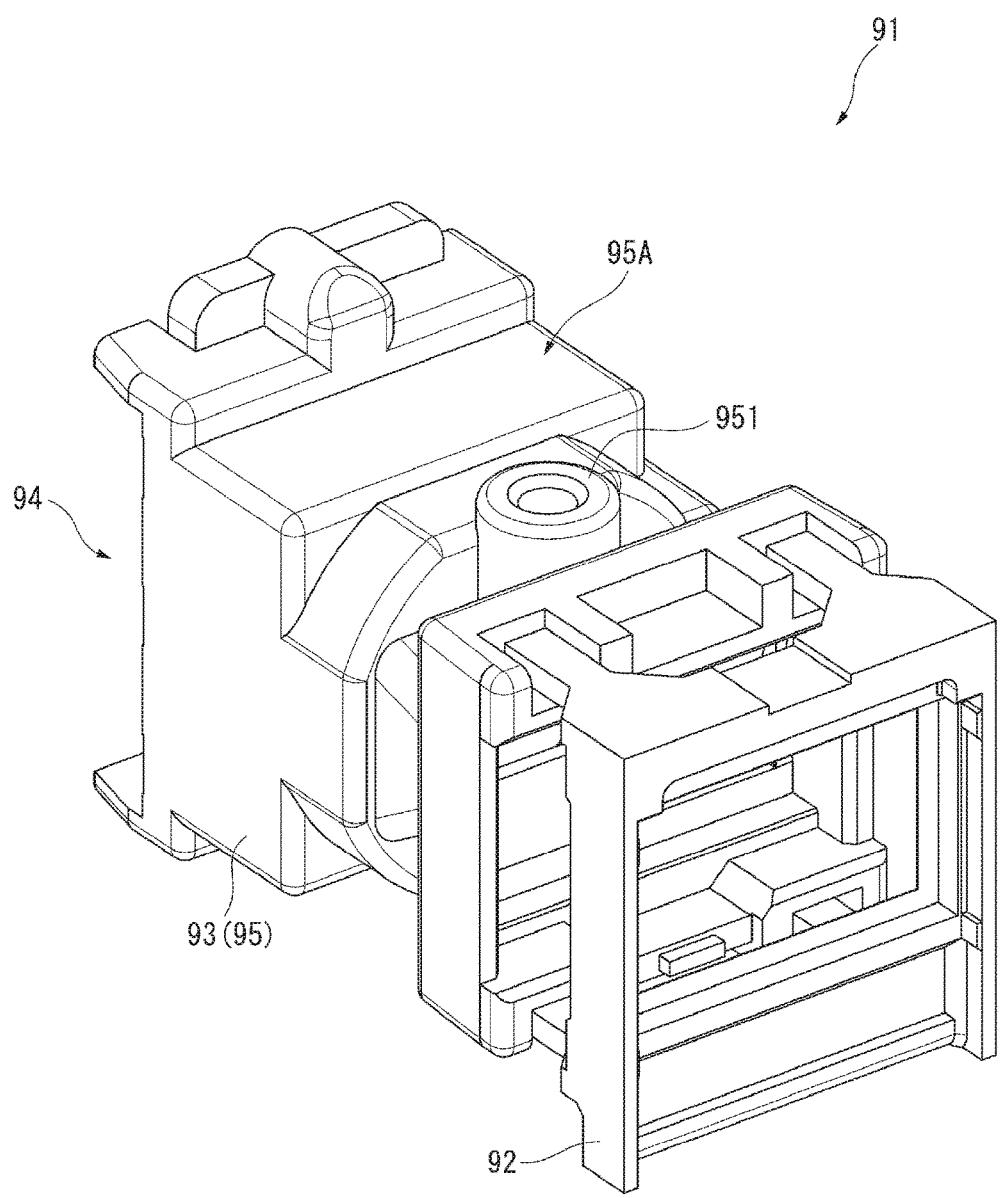
FIG. 7 is a perspective view showing an image projection section in the embodiment.
Figure 8:
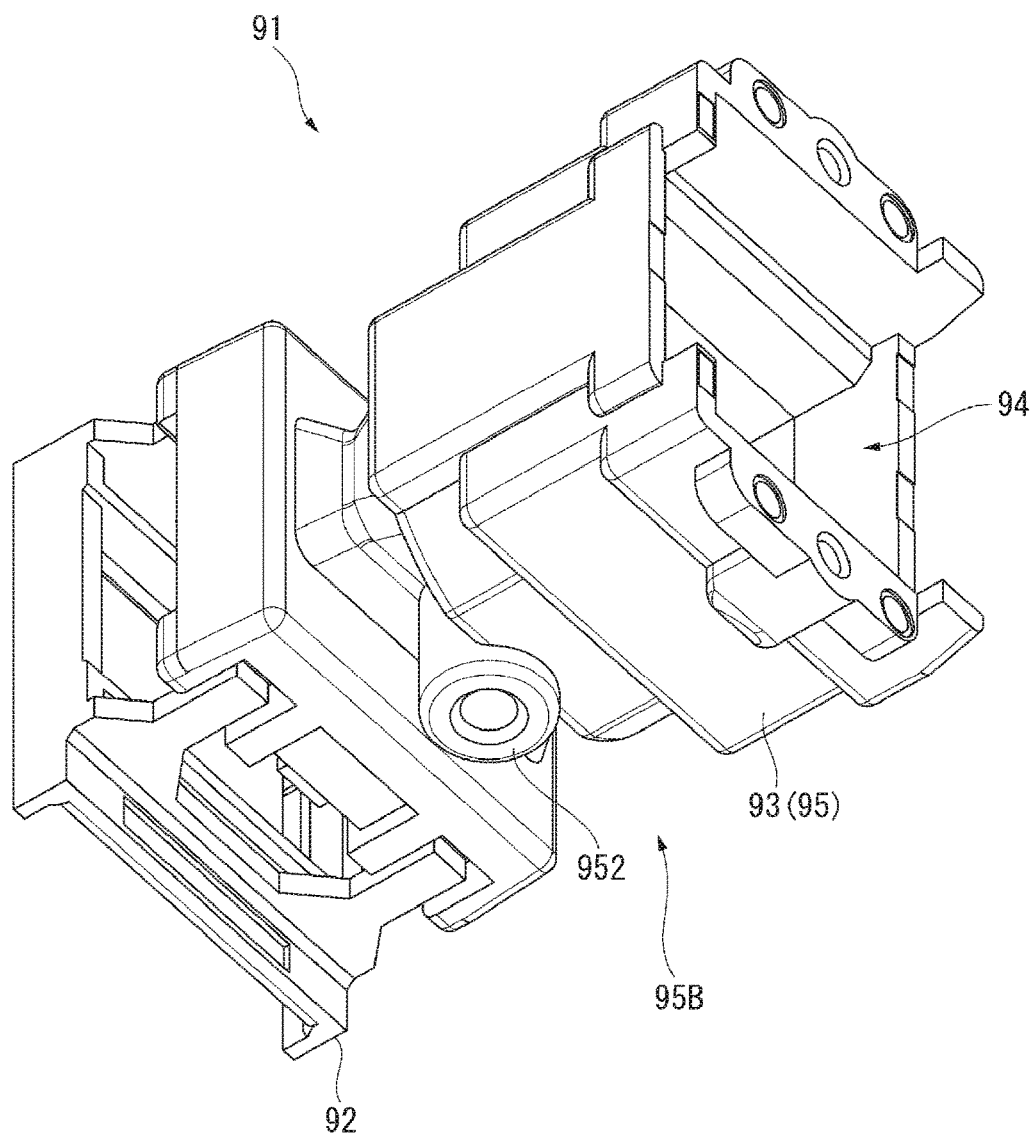
FIG. 8 is a perspective view showing the image projection section in the embodiment.

FIG. 7 is a perspective view of one of the image projection sections 91 viewed from the side (rear side) opposite the image light projection side and from above, and FIG. 8 is a perspective view of the image projection section 91 viewed from the image light projection side (front side) and from below. In FIGS. 7 and 8, a frame body of an image formation device 92 is shown, but a display panel is omitted.

The image projection section 91 in each of the optical devices 9R and 9L projects image light (image forming light) to the corresponding one of the light guide members 97R and 97L and is one of the members accommodated in the corresponding one of the accommodation sections HPR and HPL. The image projection section 91 is configured as a unit formed of the image formation device 92 and a projection optical device 93 combined and integrated with each other, as shown in FIGS. 7 and 8.

The image formation device 92 is an image formation section that forms, under the control of the control section 96, image light according to an image signal externally inputted via a cable CB. The image formation device 92 is formed of a self-luminous display panel, such as an organic EL (electro-luminescence) panel, in the present embodiment, but not necessarily, and can be formed of the combination of a light source, such as an LED (light emitting diode), and a light modulator, such as a transmissive or reflective liquid crystal panel and a device using micromirrors, such as MEMS mirrors.

The thus configured image formation device 92 is connected to the frame body 3 (fixing section 320, which will be described later, or side surface section 32R or 32L) via a heat conductive member that is not shown. Heat generated by the image formation device 92 can thus be transferred to the frame body 3, which is formed of a metal member and exposed to the outside, and dissipated out of the frame body 3.

The projection optical device 93 outputs the image light formed by the image formation device 92 to the corresponding one of the light guide members 97R and 97L. The projection optical device 93 is formed as an assembled lens including a plurality of lenses 94 and a lens barrel 95, which accommodates the plurality of lenses 94. A prism (projection prism) can be used in place of at least one of the plurality of lenses as long as the prism can guide the image light incident from the image formation device 92 to the corresponding one of the light guide members 97R and 97L.

The lens barrel 95 has a fixing section 951, which is a threaded hole formed in an upper end surface 95A, as shown in FIG. 7, and a fixing section 952, which is a threaded hole formed in a lower end surface 95B, as shown in FIG. 8. The lens barrel 95 is fixed to the fixing section 320 of the frame body 3 via the fixing section 951, as shown in FIG. 5. A substrate holder 6R is attached to the fixing section 952 of the lens barrel 95, as shown in FIG. 6. That is, the image projection section 91 including the lens barrel 95 is covered with the substrate holder 6R from below. Although not shown, the image projection section 91 in the optical device 9L is also covered with a substrate holder having the same configuration from below.

The control section 96 that forms the optical device 9L causes the image formation device 92 that also forms the optical device 9L to operate in accordance with an image signal externally supplied via the cable CB connected to the left accommodation section HPL. The control section 96 that forms the optical device 9R causes the image formation device 92 that also forms the optical device 9R to operate in accordance with the image signal inputted from the control section 96 in the optical device 9L via a signal line (not shown) that passes through the space between the front section 31 described above and the light guide members 97R, 97L. Each of the control sections 96 is also one of the members accommodated in the corresponding one of the accommodation sections HPR and HPL.

A control circuit that controls the imaging device 8 described above is implemented in the control section 96 in the optical device 9R.

The right light guide member 97R and the left light guide member 97L form the display section according to an aspect of the invention. The light guide members 97R and 97L are disposed in front of the user's right and left eyes and guide the image light outputted from the respective image projection sections 91 to the user's right and left eyes.

Specifically, the light guide member 97R causes the image light for the right eye projected from the image projection section 91 in the optical device 9R to undergo internal reflection that occurs at the surface of the light guide member 97R and travel toward the center of the light guide member 97R and guides the image light to the user's right eye via a semi-transmissive layer provided in a position according to the right eye. The same holds true for the light guide member 97L, which guides the image light for the left eye to the left eye.

Each of the light guide members 97R and 97L is made of a resin having high light transmittance in the visible light region (cycloolefin polymer, for example). The user can therefore view the outside through the light guide members 97R and 97L disposed in front of the right and left eyes.

Configuration of Side Surface Section

Figure 9:
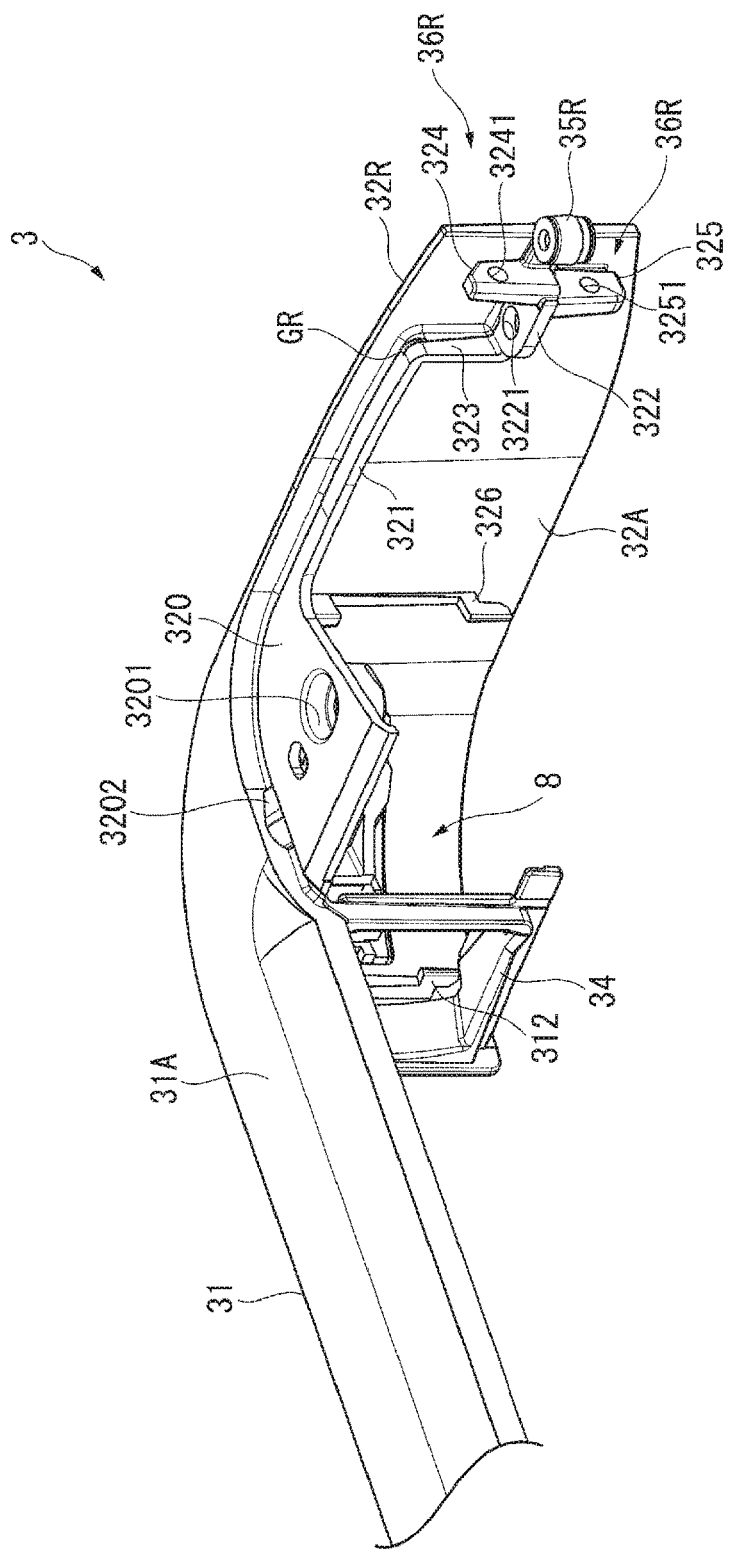
FIG. 9 is a perspective view showing a frame body in the embodiment.
Figure 10:
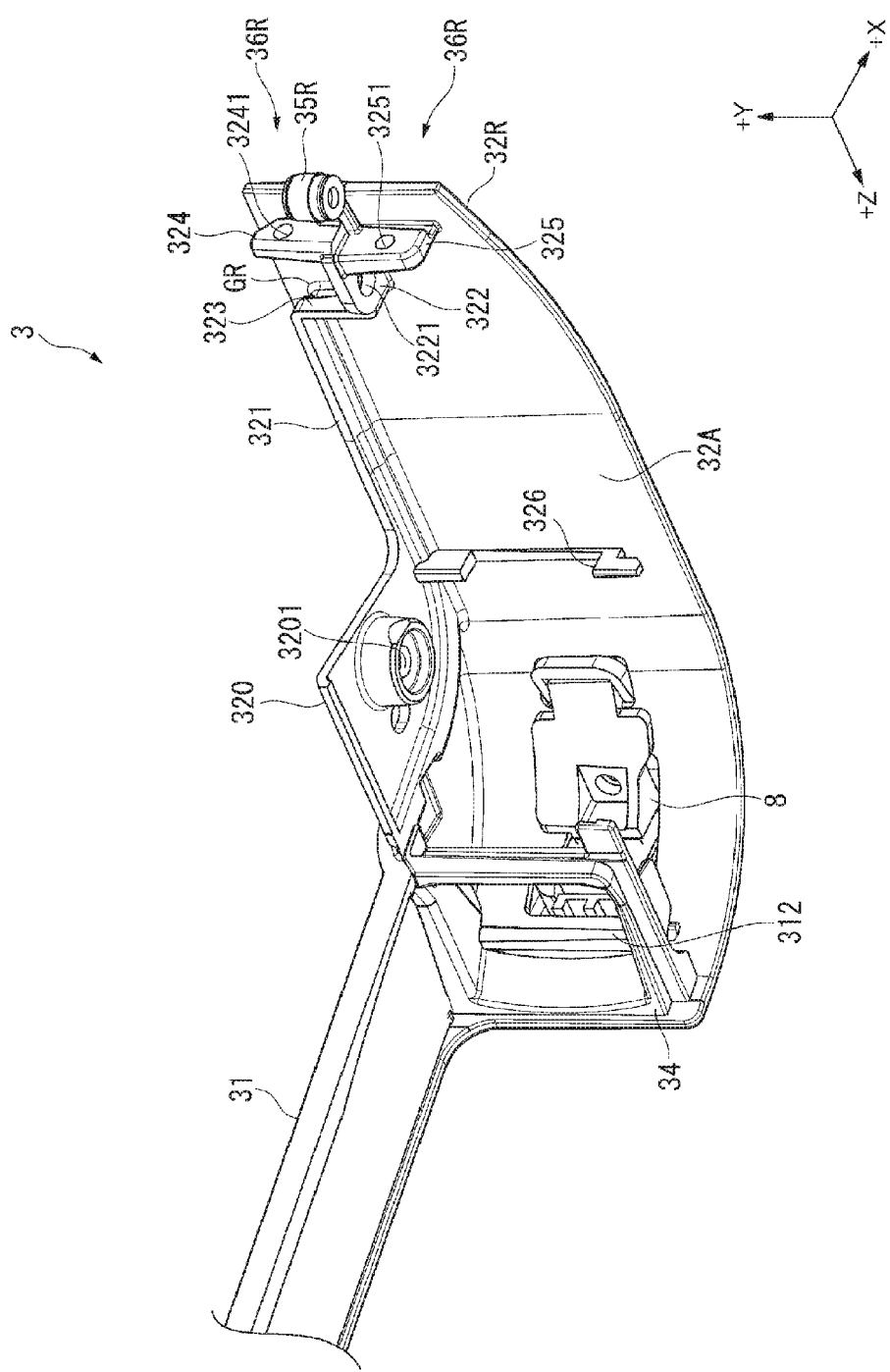
FIG. 10 is a perspective view showing the frame body in the embodiment.

FIGS. 9 and 10 are perspective views showing the frame body 3. Specifically, FIG. 9 is a perspective view of an inner surface 32A of the side surface section 32R, which forms the frame body 3, viewed from the rear side and from above, and FIG. 10 is a perspective view of the side surface section 32R viewed from the rear side and from below.

The frame body 3 corresponds to the frame member according to an aspect of the invention. The frame body 3 has the front section 31 and the right and left side surface sections 32R, 32L, as described above.

The side surface section 32R has the fixing section 320, which is raised from the inner surface 32A on the user side and connected to the upper surface of the right end section 31R described above, ribs 321 to 325, which are also raised from the inner surface 32A, and a waterproof member 34, as shown in FIGS. 9 and 10.

The fixing section 320 is located on the rear side of the right end section 31R of the front section 31 described above and in a position lowered downward from an upper end surface 31A of the front section 31. The fixing section 320 is a flat surface portion along the rightward/leftward direction (flat surface portion along XZ plane).

The fixing section 320 has a hole 3201, through which a screw to be screwed into the fixing section 951 of the lens barrel 95, which is disposed below the fixing section 320, is inserted from above, and a protrusion 3202, which is located at the front-side edge of the fixing section 320 and provided to position the upper case 5R.

It can be said that the thus configured fixing section 320, which protrudes from the inner surface 32A of the side surface section 32R, is a rib having a large amount of protrusion.

Although not shown, the side surface section 32L also has a fixing section 320 having the same configuration.

The ribs 321 and 322 extend along the extending direction of the side surface section 32R from the front section 31. Specifically, the rib 321 is located in a position close to the upper end of the side surface section 32R and extends as a continuation of the fixing section 320 described above to a position close to the rear-side end of the side surface section 32R. That is, the rib 321, along with the fixing section 320, extends from the front-side end of the side surface section 32R toward the rear side thereof along the extending direction of the side surface section 32R from the front section 31.

The rib 322 is formed roughly at the center of the side surface section 32R in the upward/downward direction and in a rear-side position of the side surface section 32R.

The ribs 323 to 325 extend along a direction roughly perpendicular to the extending direction of the side surface section 32R from the front section 31. Specifically, the rib 323 connects the rear-side end of the rib 321 to the front-side end of the rib 322. The rib 324 extends upward from the rear-side end of the rib 322, and the rib 325 extends downward from the rear-side end of the rib 322. The ribs 324 and 325 are connected to the support section 35R, by which the mounting member T1R is pivotally supported. That is, the support section 35R is formed integrally with the side surface section 32R.

The thus configured ribs 321 to 325 have the function of increasing the strength of the side surface section 32R.

Among the ribs, each of the ribs 322, 324, and 325 has a case fixing section that fixes the case member 4R.

Specifically, a case fixing section 3221 of the rib 322 is a hole through which a screw inserted through the substrate holder 6R and screwed into a threaded hole 516 (FIG. 11) of the upper case 5R is inserted.

A fixing section 3241 of the rib 324 is a threaded hole into which a screw inserted through the upper case 5R is screwed from the rear.

A fixing section 3251 of the rib 325 is a threaded hole into which a screw inserted through the upper case 5R and the lower case 7R is screwed.

As described above, rear-side end portions of the upper case 5R, the substrate holder 6R, and the lower case 7R are fixed to the ribs 322, 324, and 325 located on the rear side of the side surface section 32R.

Among the ribs 321 to 325 described above, a groove GR is formed in the ribs 321 to 324 and the fixing section 320, which are connected to each other, as shown in FIGS. 9 and 10. In detail, the groove GR, which extends along the extending direction of the side surface section 32R from the front section 31, is formed in the upper surfaces of the fixing section 320 and the ribs 321 to 324, which are connected to the fixing section 320 and reach a rear-side end portion of the side surface section 32R, in such a way that the inner surface 32A is connected to the inner surface of the groove GR. That is, the groove GR is formed over roughly the entire region from the end of the side surface section 32R on the side facing the front section 31 to the end of the side surface section 32R on the side opposite the front section 31. The front-side base end of the groove GR is located in a position close to the protrusion 3202 of the fixing section 320.

An engaging section 326, onto which a hook-shaped section 613 (FIG. 12) of the substrate holder 6R locks, is so provided as to protrude at roughly the center of the inner surface 32A described above. An engaging section 312, onto which a hook-shaped section 64 (FIG. 12) of the substrate holder 6R locks, is formed on the inner surface of the right end section 31R of the front section 31.

Although not shown, the side surface section 32L, the structure of which is a mirror-symmetric version of the structure of the side surface section 32R, also has a fixing section 320, ribs 321 to 325, and an engaging section 326 having the same configurations described above, and an engaging section having the same configuration as that of the engaging section 312 is so provided as to protrude from the inner surface of the left end section 31L.

The waterproof member 34 is formed in a frame-like shape that surrounds the circumference of a right end portion of the light guide member 97R supported by the front section 31, and the waterproof member 34 is attached to the end portion and located in a position shifted from the right end section 31R toward the center of the front section 31. The waterproof member 34 prevents a gap that allows dust and liquid to enter from being produced between the light guide member 97R and the frame body 3.

Another frame-shaped waterproof member 34 is provided around the circumference of a left end portion of the light guide member 97L, as shown in FIG. 2.

Configuration of Case Member

The case member 4R, which is combined with the side surface section 32R to form the accommodation section HPR, has the upper case 5R, the substrate holder 6R, and the lower case 7R, as shown in FIGS. 5 and 6.

The case member 4L, which is combined with the side surface section 32L to form the accommodation section HPL, also has an upper case 5L, a substrate holder (not shown), and a lower case 7L, the structures of which are mirror-symmetric versions of the structures of the upper case 5R, the substrate holder 6R, and the lower case 7R.

Configuration of Upper Case

Figure 11:
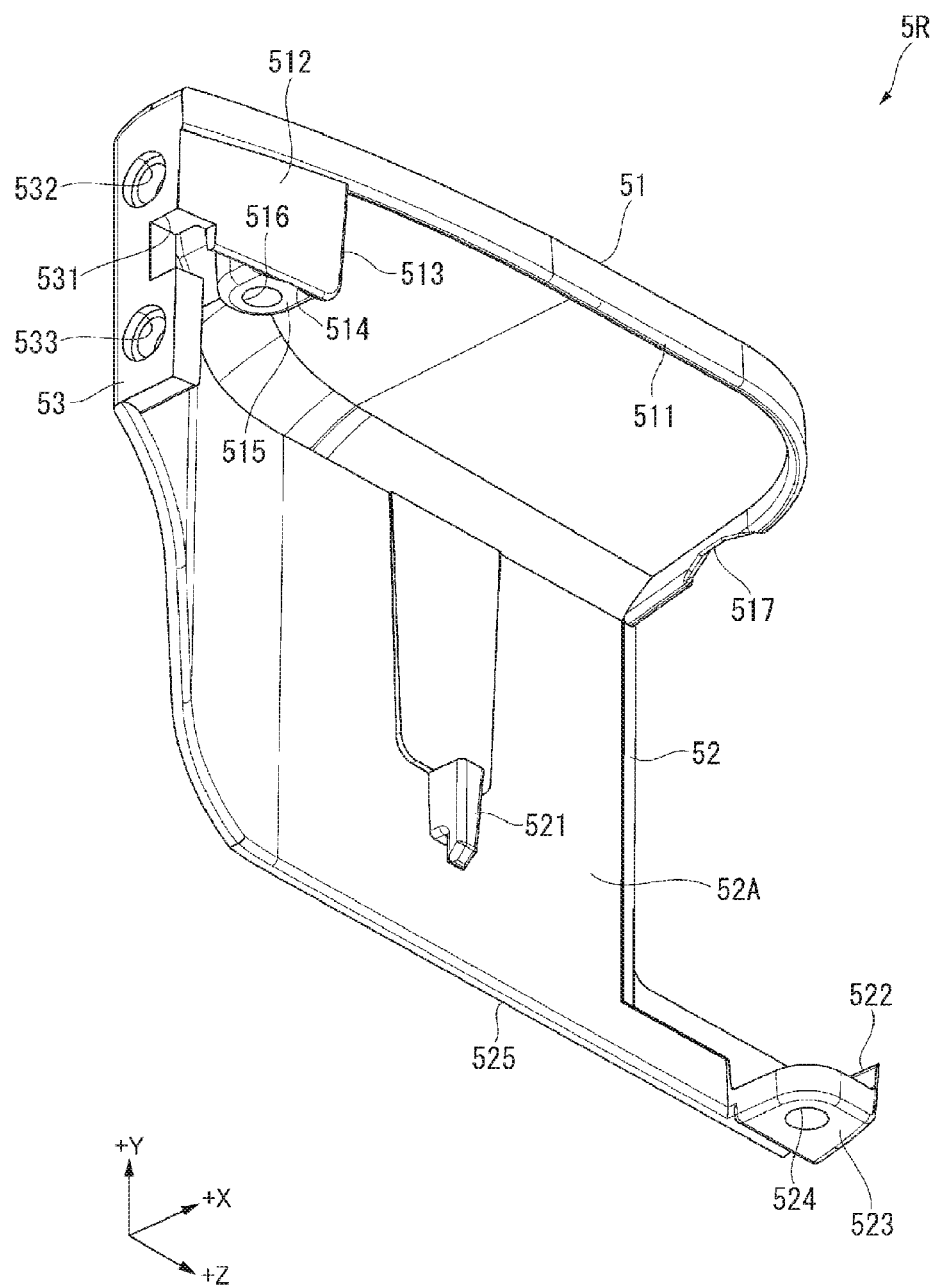
FIG. 11 is a perspective view showing an upper case in the embodiment.

FIG. 11 is a perspective view of the upper case 5R viewed from the side facing the side surface section 32R and from below.

The upper case 5R is a member that covers the image projection section 91 from above. The upper case 5R has an upper surface section 51, which is connected to the side surface section 32R, a side surface section 52, which extends downward from the user-side end of the upper surface section 51 and faces the side surface section 32R, and a rear surface section 53, which intersects the upper surface section 51 and the side surface section 52, as shown in FIG. 11.

The upper surface section 51 has a protrusion 511, which is located at the end edge opposite the side surface section 52 and protrudes downward along the end edge. The upper surface section 51 further has a protrusion 512, which is located at a rear-side portion of the opposite end edge and protrudes downward beyond the protrusion 511. Out of the protrusions, the front end surface of the protrusion 511 is inserted into the groove GR formed in the fixing section 320 and the rib 321 described above, when the upper case 5R is combined with the side surface section 32R, and comes into contact with the bottom of the groove GR. The protrusion 512 is further inserted into the groove GR formed in the ribs 323 and 322 described above, and a front-side end edge 513 and a lower end edge 514 of the protrusion 512 come into contact with the bottom of the groove GR formed in the ribs 323 and 322. That is, the protrusions 511 and 512 form a unitary protruding strip that protrudes downward, are inserted into the groove GR formed in the fixing section 320 and the ribs 321 to 324, and come into contact with the bottom of the groove GR. The end edge 513, which extends along the upward/downward direction, does not need to come into contact with the bottom surface of a portion of the groove GR that faces the end edge 513.

A boss 515 is formed on the inner surface of the upper surface section 51 (surface facing downward) and protrudes from the inner surface, and the threaded hole 516 is formed in the boss 515.

A recess 517 is formed in the front-side end edge of the upper surface section 51. The protrusion 3202 of the fixing section 320 described above is fit into the recess 517 when the upper case 5R is combined with the frame body 3, whereby the upper case 5R is positioned.

The side surface section 52 has a hook-shaped section 521, protrusions 522 and 523, and a hole 524.

The hook-shaped section 521 is so formed on an inner surface 52A of the side surface section 52 (inner surface 52A facing side surface section 32R) as to face downward. The hook-shaped section 521 engages with the substrate holder 6R.

The protrusion 522 is so formed as to protrude from a front-side lower end portion of the side surface section 52 toward the front side.

The protrusion 523 protrudes from a front end portion of the protrusion 522 toward the side surface section 32R. The protrusion 523 is a portion to be combined with the lower case 7R.

The hole 524 is formed in the protrusion 523, and a screw inserted through the lower case 7R and screwed into the substrate holder 6R is inserted through the hole 524 from below.

A lower end section 525 of the thus configured side surface section 52 comes into contact with an upper surface 73A (FIG. 14) of an outer stepped section 73 of the lower case 7R when the upper case 5R is combined with the lower case 7R.

The rear surface section 53 is located on the rear side of the ribs 324 and 325 described above when the upper case 5R is combined with the side surface section 32R. The rear surface section 53 has a recess 531 roughly at the center thereof and two holes 532 and 533 in positions that sandwich the recess 531 from above and below.

The recess 531 is a recess for exposing the support section 35R connected to the ribs 324 and 325 of the side surface section 32R to the outside.

Out of the holes 532 and 533, the hole 532, which is the upper hole, is a hole through which a screw fixed to the case fixing section 3241 described above is inserted, and the upper case 5R is fixed to the side surface section 32R when the screw is fixed to the case fixing section 3241.

The hole 533, which is the lower hole, is a hole through which a screw fixed to the case fixing section 3251 described above is inserted, and the screw is inserted through a hole 78 (FIG. 14) of the lower case 7R as well as the hole 533.

Configuration of Substrate Holder

Figure 12:
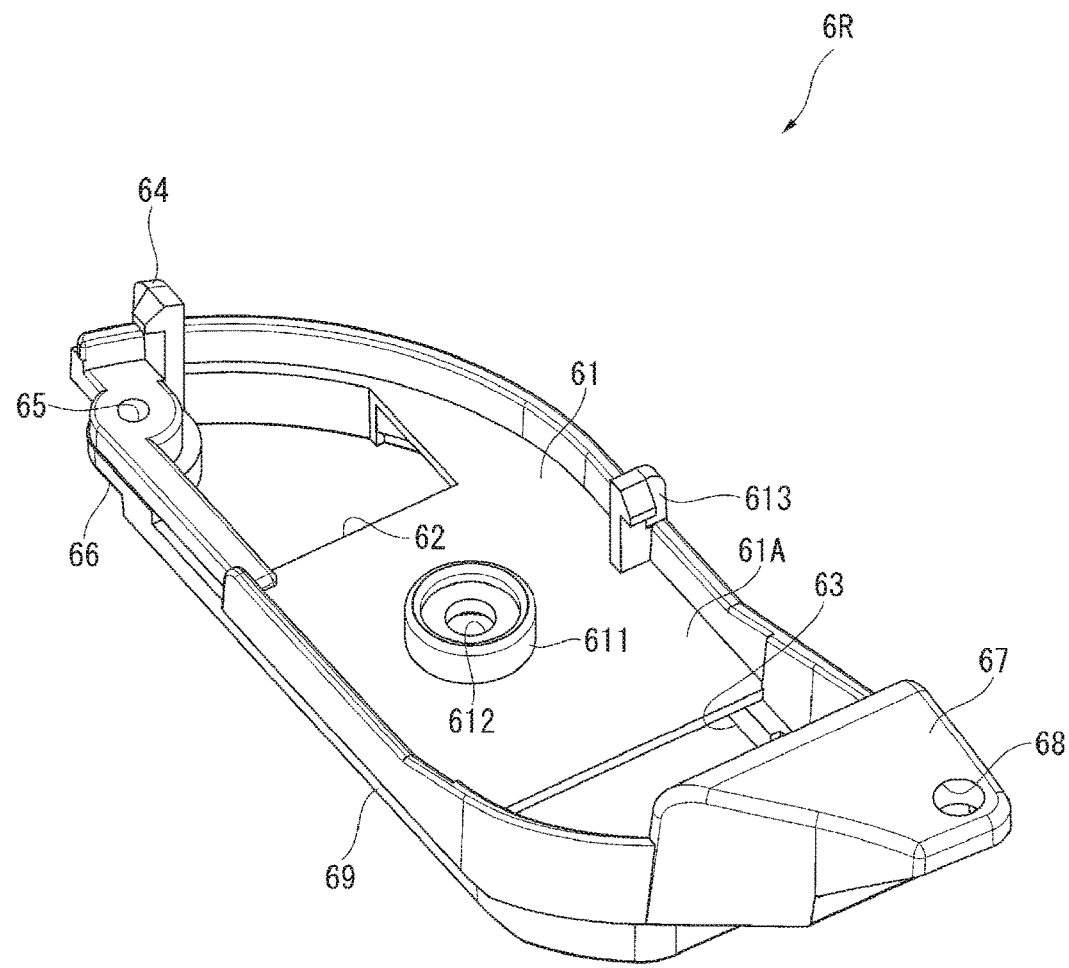
FIG. 12 is a perspective view showing a substrate holder in the embodiment.
Figure 12:
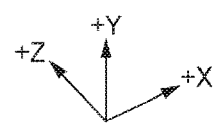
Figure 13:
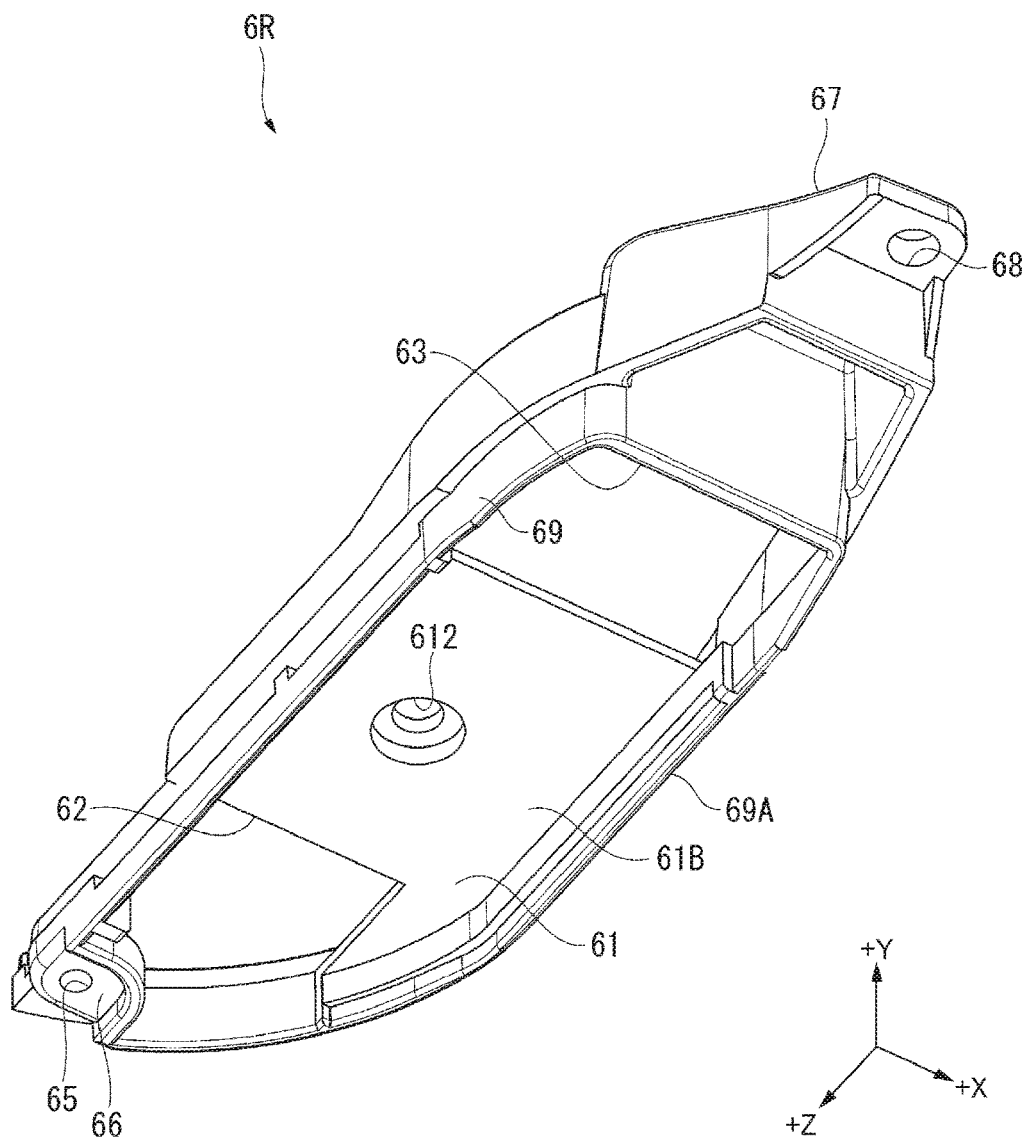
FIG. 13 is a perspective view showing the substrate holder in the embodiment.

FIG. 12 is a perspective view of the substrate holder 6R viewed from the rear side and from above, and FIG. 13 is a perspective view of the substrate holder 6R viewed from the rear side and from below.

The substrate holder 6R is an inner case that is fixed to the lens barrel 95 and covers the lens barrel 95 from below. The substrate holder 6R is formed in a frame shape having a circumferential edge raised upward with the right end edge of the substrate holder 6R extending along the side surface section 32R and the left and rear end edges of the substrate holder 6R extending along the left and rear end edges of the upper case 5R, as shown in FIGS. 12 and 13. The width dimension of the substrate holder 6R (dimension in +X direction, which is width direction) is smaller than the width dimension of the upper case 5R described above in the same direction, and the substrate holder 6R is disposed in the space surrounded by the upper case 5R and the side surface section 32R.

The thus configured substrate holder 6R has a fixing section 61, openings 62 and 63, the hook-shaped section 64, a threaded hole 65, a recess 66, a protrusion 67, a hole 68, and a lower end section 69.

The fixing section 61 is a portion that is formed in a flat-plate-like shape and located roughly at the center of the substrate holder 6R, has an upper surface 61A, to which the lens barrel 95 described above is fixed, and has a lower surface 61B, on which the control section 96 is disposed. A boss 611, which has a hole 612, is so provided roughly at the center of the upper surface 61A as to protrude upward. The substrate holder 6R is fixed to the lens barrel 95 when a screw inserted through the hole 612 from below is fixed to the fixing section 952 of the lens barrel 95.

The hook-shaped section 613, which serves as a positioner, is so provided on the upper surface 61A as to protrude therefrom. The hook-shaped section 613 locks onto the engaging section 326 of the frame body 3.

The opening 62 is located on the front side relative to the fixing section 61. Through the opening 62 are inserted the signal line connected to the control section 96 disposed below the fixing section 61 and a flexible printed board FPC (FIG. 15) including a signal line extending from the imaging device 8.

The opening 63 is located on the rear side relative to the fixing section 61. Through the opening 63 is inserted a signal line (not shown) extending from the image formation device 92 integrated with the lens barrel 95 described above and connected to the control section 96.

The hook-shaped section 64 is a positioner located in a front-side end portion of the substrate holder 6R. The hook-shaped section 64 locks onto the engaging section 312 described above (FIGS. 9 and 10).

The threaded hole 65 is formed in a position close to the hook-shaped section 64. To the threaded hole 65 is fixed a screw inserted from below through a hole 76 (FIG. 14) of the lower case 7R and the hole 524 (FIG. 11) of the upper case 5R.

The recess 66 is formed in the lower surface of the portion where the threaded hole 65 is formed. The protrusion 523 (FIG. 11) of the upper case 5R is fit into the recess 66.

The protrusion 67 is located on the rear side of the substrate holder 6R and protrudes upward beyond the raised portion formed along the circumferential edge of the substrate holder 6R. The protrusion 67 comes into contact with the lower surface of the rib 322 described above (FIGS. 9 and 10) when the substrate holder 6R is combined with the side surface section 32R.

The hole 68 is formed in the protrusion 67. Through the hole 68 is inserted from below a screw inserted through the case fixing section 3221 described above (FIGS. 9 and 10) and fixed to the threaded hole 516 (FIG. 11) of the upper case 5R.

The lower end section 69 protrudes downward from a portion slightly inside the circumferential edge of the substrate holder 6R and surrounds the circumference of the control section 96 (circumference in ±X directions and ±Z directions) disposed below the fixing section 61 described above, as shown in FIG. 6. The lower end section 69 is located further below the lower surface 61B, on which the control section 96 is disposed, and a front end surface 69A of the lower end section 69 (downward facing surface of lower end section 69) comes into contact with an inner stepped section 72 (FIG. 14) of the lower case 7R. The inner stepped section 72 will be described later.

Configuration of Lower Case

Figure 14:
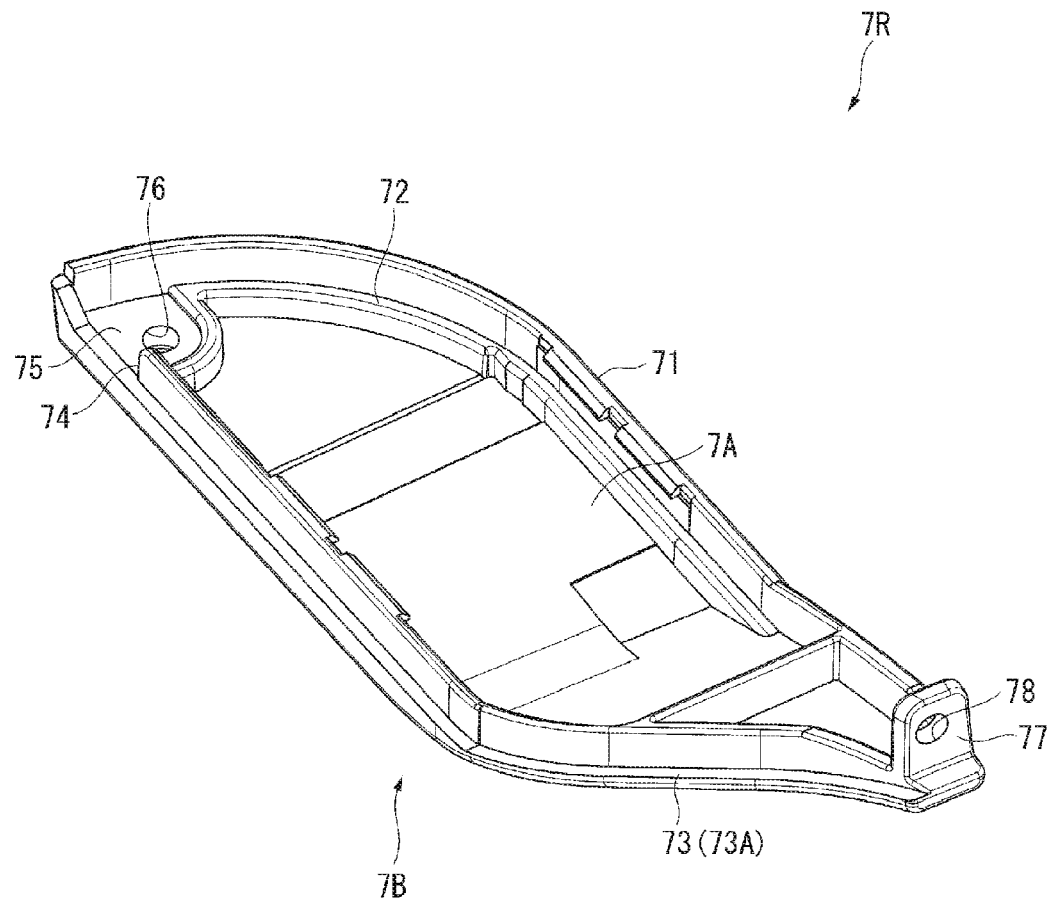
FIG. 14 is a perspective view showing a lower case in the embodiment.

FIG. 14 is a perspective view of the lower case 7R viewed from the rear side and from above.

The lower case 7R is a member that covers the substrate holder 6R from below and is combined with the upper case 5R and the side surface section 32R to form the outer edge of the accommodation section HPR.

The lower case 7R has an outer shape similar to that of the substrate holder 6R and is so shaped that the right end edge thereof extends along the side surface section 32R and the left and rear end edges thereof extend along the left and rear end edges of the upper case 5R, as shown in FIG. 14. In addition to the above, a rear-side end portion of the lower case 7R is so formed as to incline upward.

The thus configured lower case 7R has a raised section 71, the inner stepped section 72, the outer stepped section 73, a cutout 74, a flat section 75, the hole 76, a raised section 77, and the hole 78.

The raised section 71 is raised upward from the circumferential edge of a bottom surface 7A (surface facing substrate holder 6R) of the lower case 7R. The raised section 71 is so formed that the shape of the outer edge thereof roughly conforms to the shape of the outer edge of the substrate holder 6R viewed from above. When the lower case 7R engages with the side surface section 32R, the outer side surface of the right-side (+X-direction-side) raised section 71 of the lower case 7R comes into contact with a lower end portion of the inner surface 32A of the side surface section 32R.

The inner stepped section 72 is so formed inside the raised section 71 that the upper surface of the inner stepped section 72 is located below the upper end of the raised section 71 but above the bottom surface 7A (surface facing upward) of the lower case 7R. The lower end surface of the lower end section 69 (FIGS. 12 and 13) of the substrate holder 6R comes into contact with the upper surface of the inner stepped section 72, whereby a placement space in which the control section 96 described above is placed is formed between the lower surface 61B of the fixing section 61 of the substrate holder 6R and the bottom surface 7A of the lower case 7R. That is, the lower end section 69 of the substrate holder 6R is accommodated inside the raised section 71, whereby not only is the circumference of the control section 96 surrounded by the raised section 71 but also the control section 96 is covered with the fixing section 61 (FIGS. 12 and 13) from above and covered with the bottom surface 7A from below.

The outer stepped section 73 is so formed outside the raised section 71 of the lower case 7R that the upper surface of the outer stepped section 73 is below the upper end of the raised section 71 but above a lower surface 7B (surface facing downward) of the lower case 7R. The lower end section 525 (FIG. 11) of the side surface section 52 of the upper case 5R comes into contact with the upper surface of the outer stepped section 73. As a result, the joint between the lower case 7R and the upper case 5R/the side surface section 32R can be less visible, and a situation in which a gap is created between these components can be avoided.

The cutout 74 is formed in a front-side end portion of the lower case 7R by cutting part of the raised section 71.

The flat section 75 is located inside the lower case 7R corresponding to the cutout 74. The protrusion 523 (FIG. 11) of the upper case 5R is inserted through the cutout 74 and disposed in the space between the flat section 75 and the recess 66 (FIG. 13) of the substrate holder 6R.

The hole 76 is formed in the flat section 75, and a screw inserted from below through the hole 76 is inserted through the hole 524 formed in the protrusion 523 and fixed to the threaded hole 65 (FIG. 13) formed in the substrate holder 6R. As a result, the upper case 5R, the substrate holder 6R, and the lower case 7R are fixed on the front side.

The raised section 77 is raised upward from a rear-side end portion of the lower case 7R.

The hole 78 is formed in the raised section 77. Through the hole 78 is inserted a screw inserted through the hole 533 (FIG. 11) of the upper case 5R, and the screw is fixed to the case fixing section 3251 (FIGS. 9 and 10) located at the rib 325 described above.

Figure 15:
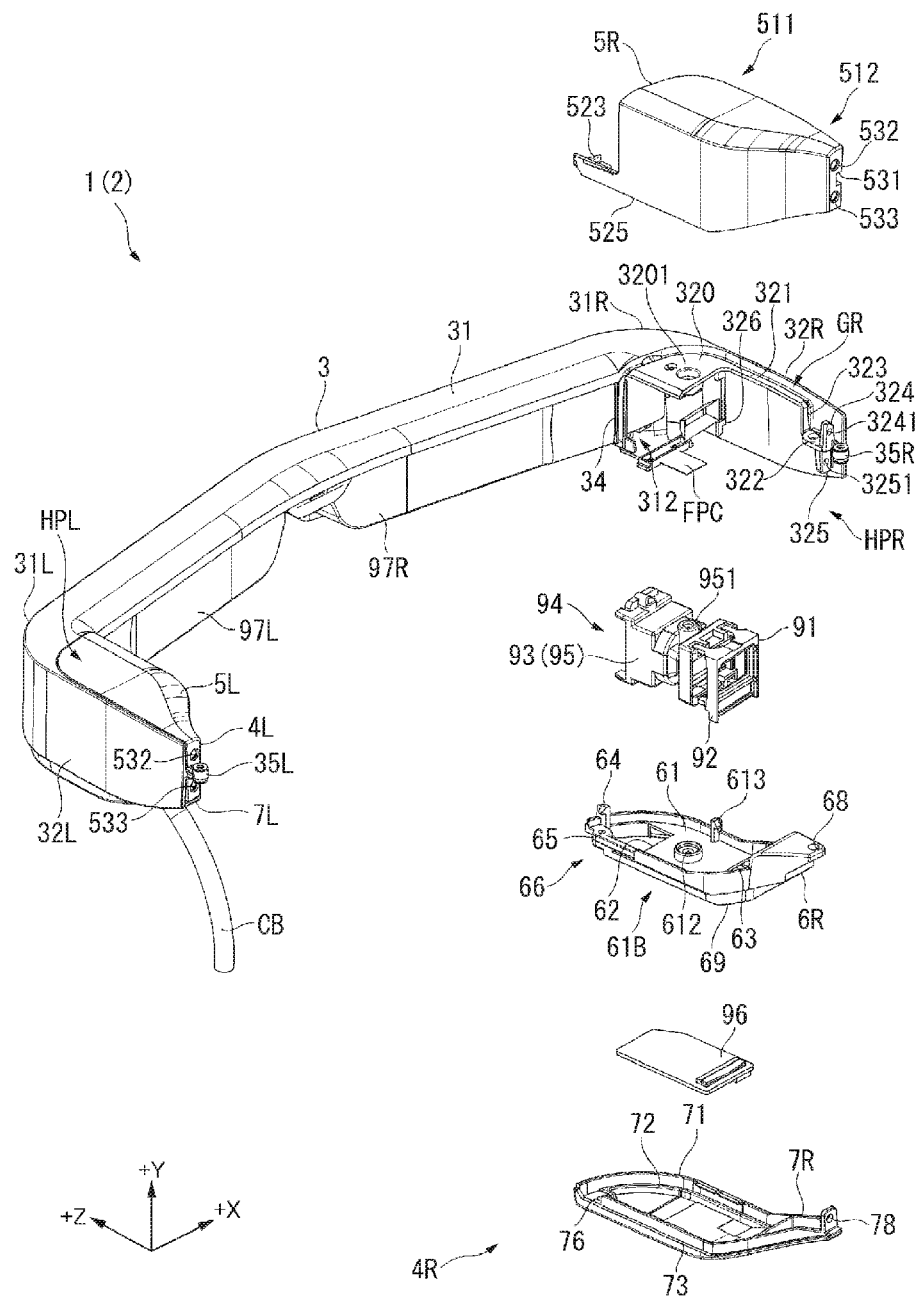
FIG. 15 describes the step of attaching an image projection section, a control section, and a case member to the frame body in the embodiment.

Attachment of Image Projection Section, Control Section, and Case Member to Frame Body FIG. 15 describes the step of attaching the image projection section 91 and the control section 96 in the optical device 9R and the case member 4R to the frame body 3.

To attach the image projection section 91 and the control section 96 in the optical device 9R and the case member 4R to the frame body 3 described above, a screw inserted from above through the hole 3201 of the fixing section 320 of the side surface section 32R is first fixed to the fixing section 951 of the lens barrel 95, as shown in FIG. 15. The image projection section 91 is thus fixed to the fixing section 320.

The substrate holder 6R is then fixed from below to the image projection section 91 (lens barrel 95). Specifically, the substrate holder 6R is attached to the frame body 3 in such a way that the hook-shaped sections 613 and 64, each of which serves as a positioner, lock onto the engaging sections 326 and 312 of the frame body 3. In this state, the upper end of the protrusion 67 comes into contact with the lower surface of the rib 322. In this state, a screw inserted from below into the hole 612 is fixed to the fixing section 952 of the lens barrel 95. As a result, the substrate holder 6R is fixed to the image projection section 91 in such a way that the image projection section 91 is covered from below, and the substrate holder 6R is temporarily fixed to (positioned relative to) the frame body 3.

The control section 96 is then disposed on the lower surface 61B of the fixing section 61 of the substrate holder 6R. At this point, the flexible printed board FPC inserted through the opening 62 is connected to the control section 96, and the signal line (not shown) from the image formation device 92 inserted through the opening 63 is connected to the control section 96.

Thereafter, the upper case 5R is so attached as to cover the image projection section 91 from above, and the lower case 7R is so attached as to cover the substrate holder 6R from below, followed by combination of the upper case 5R and the lower case 7R with each other and fixation of the combined cases to the side surface section 32R.

At this point, the upper case 5R is combined with the side surface section 32R from the user side in such a way that the protrusions 511 and 512 of the upper case 5R come into contact with the bottom of the groove GR formed in the fixing section 320 and the ribs 321 to 323 of the side surface section 32R. As a result, a base end portion (portion connected to rib 324) of the support section 35R is located in the recess 531, and the protrusion 523 is located in the recess 66 of the substrate holder 6R.

In this state, a screw is inserted from below through the hole 68 of the substrate holder 6R and the case fixing section 3221 (FIGS. 9 and 10), and the screw is fixed to the threaded hole 516 (FIG. 11) of the upper case 5R. As a result, the side surface section 32R is fixed to the upper case 5R and the substrate holder 6R on the rear side.

Further, a screw inserted into the hole 532 of the upper case 5R is fixed to the case fixing section 3241 of the rib 324, whereby the upper case 5R is fixed to the side surface section 32R.

On the other hand, the upper surface of the inner stepped section 72 of the lower case 7R is caused to come into contact with the lower end surface of the lower end section 69 of the substrate holder 6R, and the lower end edge of the lower end section 525 of the upper case 5R is caused to come into contact with the outer stepped section 73, whereby the lower case 7R is combined with the upper case 5R, the substrate holder 6R, and the side surface section 32R.

In this state, a screw is inserted from below into the hole 76 of the lower case 7R, and the screw is inserted through the hole 524 of the upper case 5R, followed by fixation of the screw to the threaded hole 65 of the substrate holder 6R, whereby the upper case 5R, the substrate holder 6R, and the lower case 7R are integrated with one another on the front side of the frame body 3.

Further, a screw is inserted into the hole 533 of the upper case 5R, and the screw is inserted through the hole 78 of the lower case 7R, followed by fixation of the screw to the case fixing section 3251 of the rib 325. As a result, the upper case 5R and the lower case 7R are fixed to the side surface section 32R on the rear side.

The step described above allows the image projection section 91 and the control section 96 in the optical device 9R and the case member 4R to be attached to the frame body 3.

The image projection section 91 and the control section 96 in the optical device 9L and the case member 4L can be attached to the frame body 3 by using the same step.

Structure for Attaching Mounting Member

Figure 16:
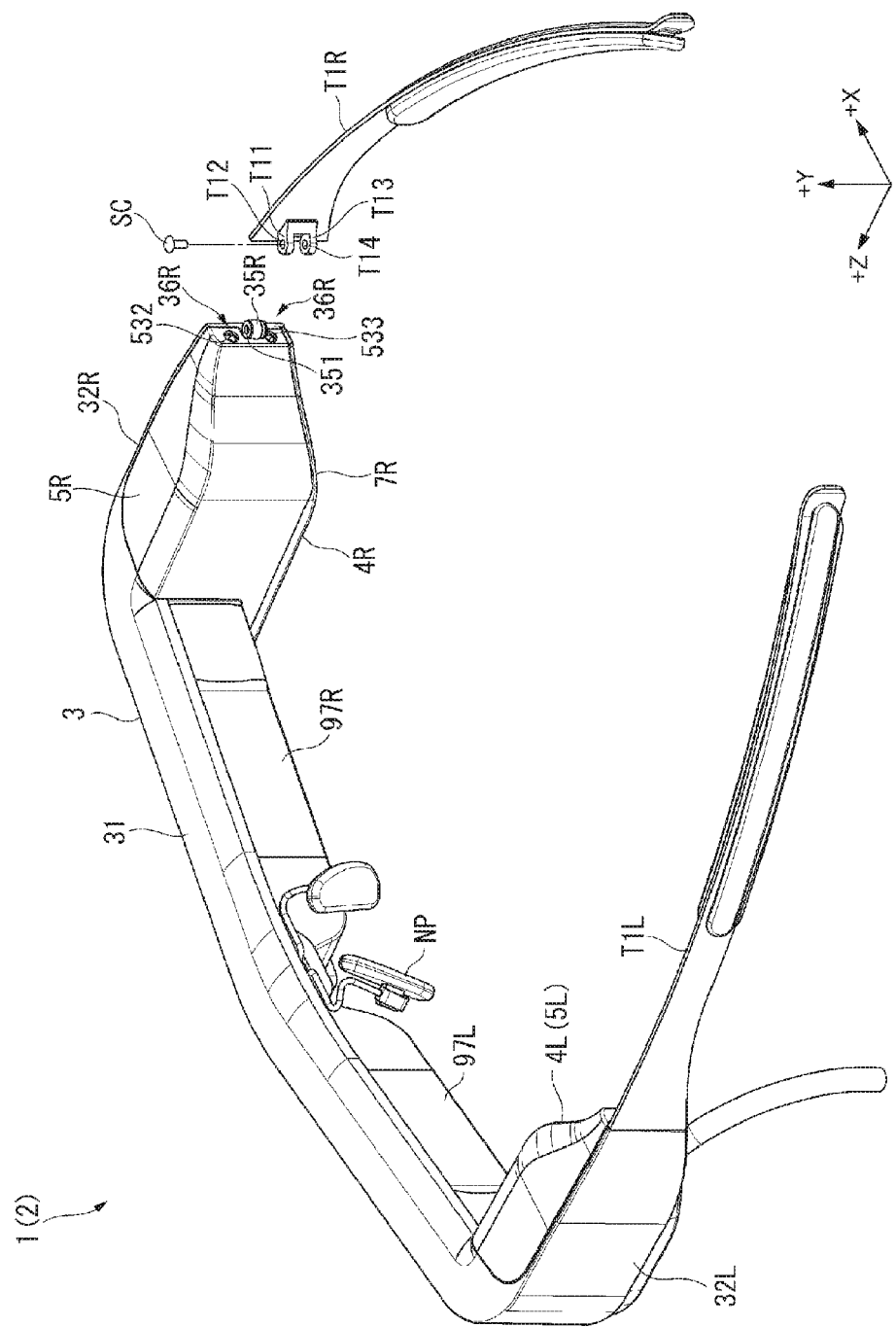
FIG. 16 is a perspective view showing the frame body and mounting members in the embodiment.

FIG. 16 is a perspective view of the HMD 1 viewed from the rear side and from above with the mounting member T1R out of the mounting members T1R and T1L separated from the HMD 1.

The mounting members T1R and T1L are attached to the support sections 35R and 35L, which are formed integrally with the ribs 324 and 325 and protrude through the case members 4R and 4L toward the rear side, in such a way that the mounting members T1R and T1L are allowed to pivot to the user side, as described above.

The mounting members T1R and T1L are so tapered that the dimension thereof in the upward/downward direction decreases with distance to the rear side along the shape of the side surfaces of the side surface sections 32R and 32L and so formed as to have a curved shape, when viewed from above, along the shape of the temporal regions of the user on whom the HMD 1 is mounted, as shown in FIG. 16.

Out of the mounting members T1R and T1L, a front-side end portion (end portion facing frame body 3) of the mounting member T1R is provided with protrusions T11 and T13, which protrude toward the user (leftward) and are arranged side by side in the upward/downward direction. Out of the protrusions T11 and T13, the protrusion T11, which is an upper protrusion, has a hole T12, through which a screw SC as a fastener corresponding to the first attaching section according to an aspect of the invention can be inserted downward (first direction), and the protrusion 113, which is a lower protrusion, has a threaded hole T14, into which the screw SC inserted through the hole T12 can be screwed.

Although not shown, the mounting member T1L, the structure of which is a mirror-symmetric version of the structure of the mounting member T1R, has the same configuration as that of the mounting member T1R.

On the other hand, the support section 35R corresponds to the first support section according to an aspect of the invention and is formed in a cylindrical shape having a center axis extending in the upward/downward direction. The support section 35R has a hole 351, through which the screw SC inserted through the hole T12 is inserted. Although not shown, the support section 35L as the first support section for the mounting member T1L is also formed in a cylindrical shape having a hole 351.

To attach the mounting member T1R described above to the support section 35R, the protrusions T11 and T13 are so placed as to sandwich the support section 35R. After the screw SC described above is inserted downward into the hole T12, the screw SC is inserted into the hole 351 and further screwed into the threaded hole T14. The mounting member T1R can thus be so attached to the support section 35R as to be allowed to pivot. The mounting member T1L can be attached to the support section 35L in the same manner.

Structure for Attaching Another Mounting Member

Figure 17:
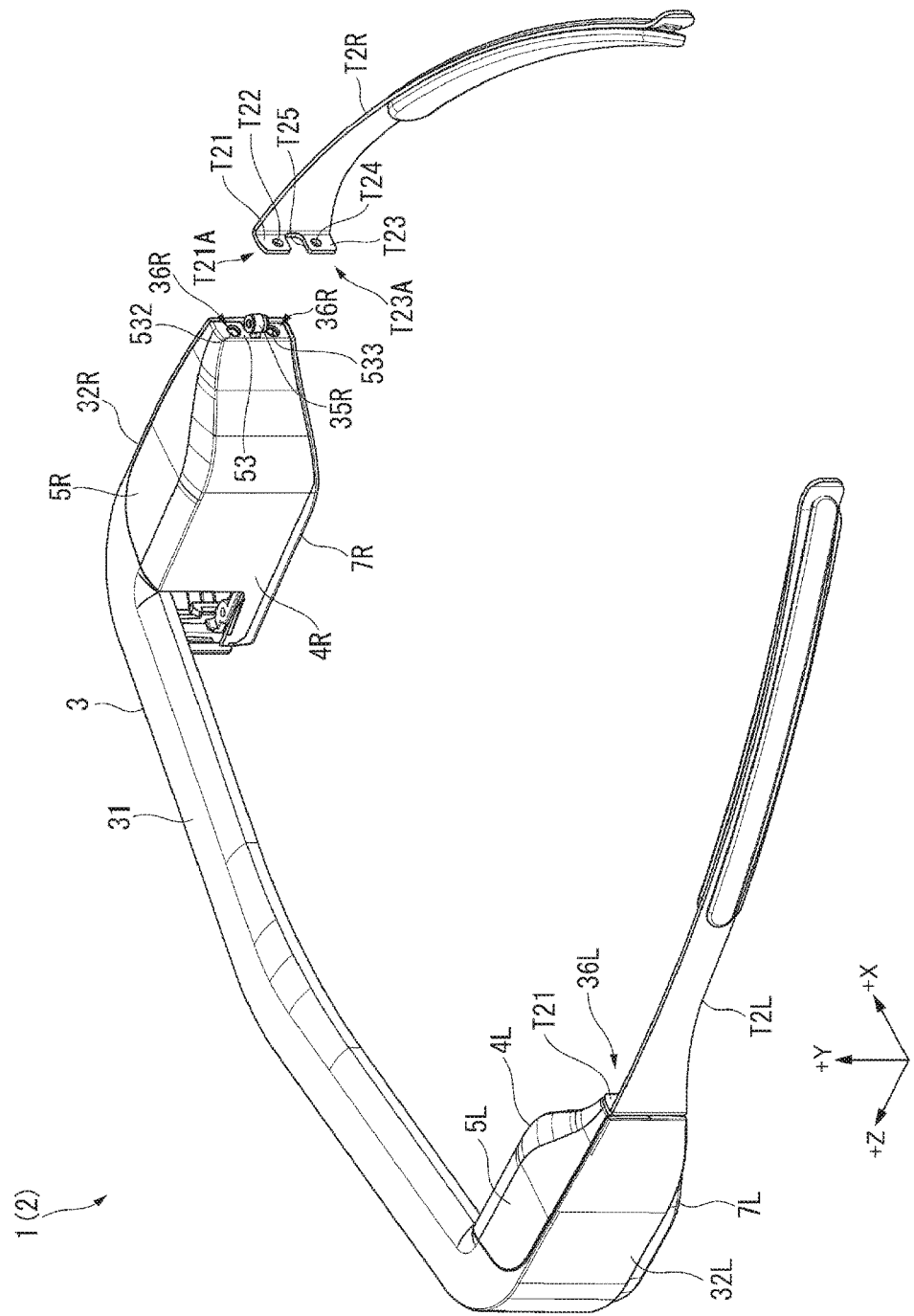
FIG. 17 is a perspective view showing the frame body and mounting members in the embodiment.

FIG. 17 is a perspective view of the frame body 3 and mounting members T2R and T2L viewed from the rear side and from above. In FIG. 17, the light guide members 97R and 97L and other components are omitted.

The mounting members T2R and T2L, which differ from the mounting members T1R and T1L, can be attached to the frame body 3, as shown in FIG. 17. The mounting members T2R and T2L have roughly the same shapes as those of the mounting members T1R and T1L but differ therefrom in terms of the structure for attaching the mounting members T2R and T2L to the frame body 3.

Specifically, the mounting member T2R has bent sections T21 and T23, which are bent leftward, provided at the front-side end of the mounting member T2R, and holes T22 and T24, through which screws SC1 and SC2 (FIG. 18), which serve as fasteners corresponding to a second fastener and attach the mounting member T2R to a support section 36R, are inserted from the rear side, are formed in the bent sections T21 and T23. Front-side end surfaces T21A and T23A of the bent sections T21 and T23 are not only end surfaces extending along an XY plane but also contact surfaces that come into contact with the rear surface section 53 of the upper case 5R described above when the mounting member T2R is attached to the frame body 3.

A recess T25 is formed between the bent sections T21 and T23, and the support section 35R described above is inserted through the recess T25 when the mounting member T2R is attached to the frame 2.

Although not illustrated in detail, the mounting member T2L, the structure of which is a mirror-symmetric version of the structure of the mounting member T2R, has the same configuration as that of the mounting member T2R. Further, each of the mounting members T2R and T2L is formed of a plate having a user-side surface and a surface opposite the user-side surface to each of which an elastic member made, for example, of rubber is glued, as each of the mounting members T1R and T1L described above is. The plate is made of a synthetic resin or a metal, such as titanium.

Figure 18:
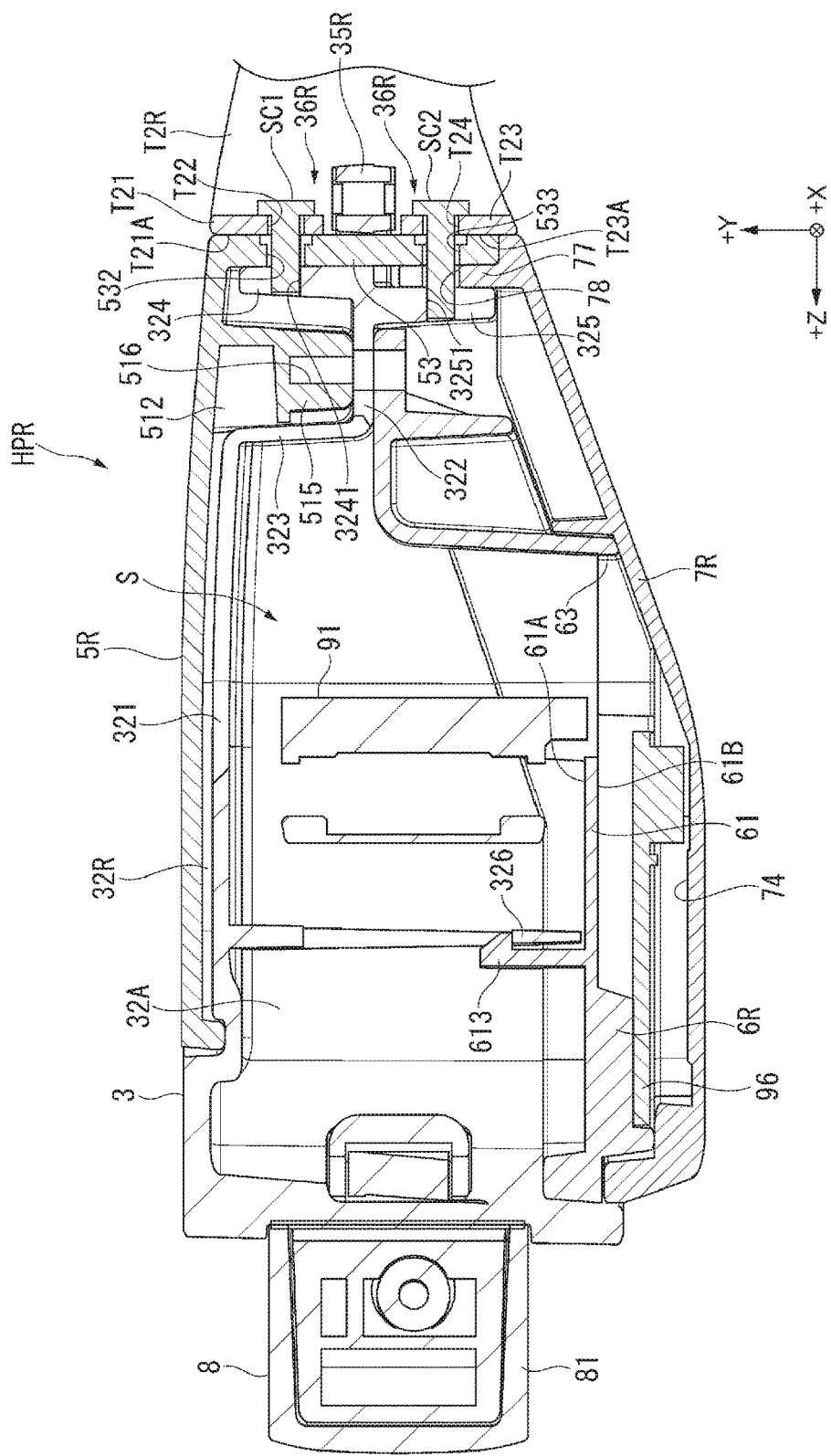
FIG. 18 is a cross-sectional view showing an accommodation section and one of the mounting members in the embodiment.

FIG. 18 is a longitudinal cross-sectional view of the accommodation section HPR of the frame body 3 to which the mounting member T2R is attached.

In the case where the mounting member T2R described above is attached to the frame body 3, the support section 36R as the second support section according to an aspect of the invention is used in place of the support section 35R.

The support section 36R is formed of the case fixing sections 3241 and 3251 of the ribs 324 and 325 covered with the upper case 5R in the side surface section 32R, as shown in FIG. 18. In detail, the support section 36R is formed of two support sections that sandwich the support section 35R from above and below. The support section located above the support section 35R is the case fixing section 3241, and the support section located below the support section 35R is the case fixing section 3251. The support section 36R including the case fixing section 3241 and 3251 is located in the upper case 5R, with the screw SC1 inserted through the hole 532 of the upper case 5R attached to the case fixing section 3241, which is one of the two support sections that form the support section 36R, and the screw SC2 inserted through the hole 533 of the upper case 5R attached to the case fixing section 3251, which is the other one of the two support sections that form the support section 36R, as described above.

As described above, in the frame body 3, the support section 36R is located in the vicinity of the support section 35R, and the support section 36R is, in detail, located in portions that sandwich the support section 35R in the upward/downward direction.

To attach the mounting member T2R to the support section 36R, the end surfaces T21A and T23A are caused to come into contact with the rear surface section 53 in such a way that the positions of the holes 532 and 533 of the upper case 5R coincide with the positions of the holes T22 and T24. In this state, the screw SC1 is inserted from the rear side toward the front side into the holes T22 and 532 along a second direction that is opposite the extending direction of the mounting member T2R from the frame body 3 and is roughly perpendicular to the first direction described above, and the screw SC1 is screwed into the case fixing section 3241. Further, the screw SC2 is inserted from the rear side toward the front side into the holes T24 and 533 along the second direction described above, further inserted through the hole 78 of the lower case 7R, and then screwed into the case fixing section 3251. The mounting member T2R is thus fixed to the support section 36R and therefore the frame body 3 without pivotal motion of the mounting member T2R around the +Z direction.

Although not shown, the mounting member T2L can also be attached to a support section 36L, which is formed of the case fixing sections 3241 and 3251 of the side surface section 32L, in the same attachment procedure in accordance with which the mounting member T2R is attached.

Variations of Mounting Member

In the HMD 1 described above, not only can the mounting members T1R, T1L, T2R, and T2L described above and placed on the user's ears be attached to the frame body 3, but also other mounting members that come into contact with other portions of the user, such as the user's occipital, temporal regions, and forehead, to mount the HMD 1 on the user can be attached to the frame body 3.

As the mounting members described above, the following mounting members can be presented by way of example.

Variation 1 of Mounting Member

Figure 19:
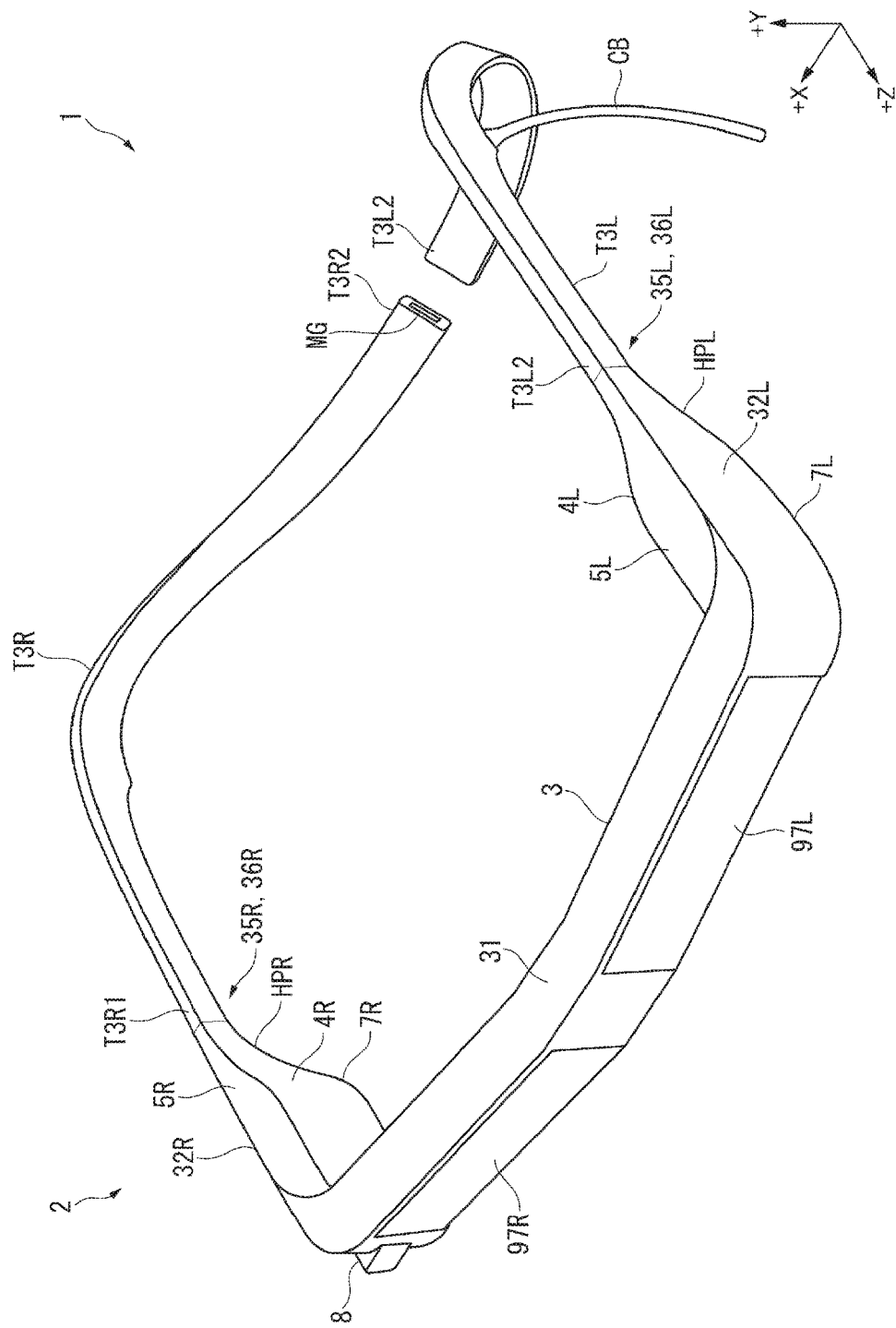
FIG. 19 is a perspective view showing the frame body and mounting members in the embodiment.
Figure 20:
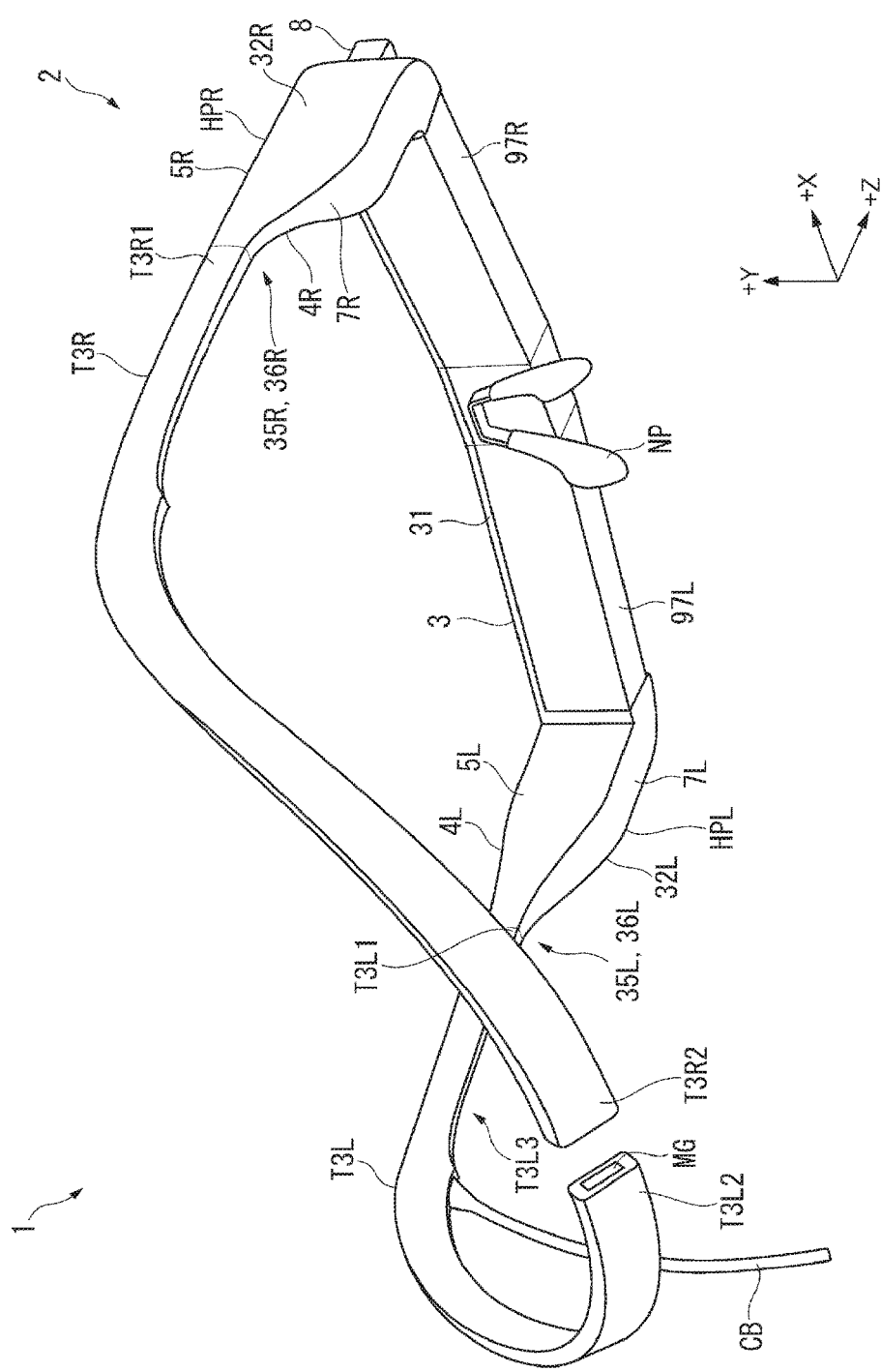
FIG. 20 is a perspective view showing the frame body and the mounting members in the embodiment.

FIGS. 19 and 20 are perspective views of the frame body 3 and mounting members T3R and T3L viewed from the front and rear sides and from above and below, respectively.

The mounting members T3R and T3L shown in FIGS. 19 and 20 can be attached to the frame body 3.

Each of the mounting members T3R and T3L is a band made of a resin, such as urethane, and having flexibility, and front-side end sections T3R1 and T311 are connected to rear-side ends sections of the accommodation sections HPR and HPL (rear side sections 53 of upper cases 5R and 5L), respectively. The end section T3R1 is attachable to the support section 35R or 36R, and the end section T3L1 is attachable to the support section 35L or 36L. The mounting members T3R and T3L, which extend from the rear-side end sections of the accommodation sections HPR and HPL toward the rear side, are so disposed as to extend along the user's temporal regions and occipital (portion in the vicinity of occipital external protuberance) when the HMD 1 is mounted on the user's head.

A magnet MG is provided in each of an end section T3R2, which is an end section opposite the end section T3R1 of the mounting member T3R, and an end section T3L2, which is an end section opposite the end section T3L1 of the mounting member T3L. The magnets MG attract each other when the user mounts the HMD 1 on the head and the end sections T3R2 and T3L2 are caused to approach each other. The mounting members T3R and T3L can thus be readily connected to each other in the vicinity of the user's occipital, and the HMD 1 can therefore be readily mounted on the user's head. The mounting members T3R and T3L do not necessarily have the same length and may, for example, have lengths that allow the mounting members T3R and T3L to be connected to each other in the vicinity of one of the user's temporal regions.

The mounting member T3L, which is located on the left side, has a cable support section T3L3, which supports the cable CB extending from the case member 4L, and the cable support section T3L3 supports the cable CB in the mounting member T3L. When the HMD 1 is mounted on the head, the cable CB is exposed to the outside through the mounting member T3L, specifically, a portion thereof according to a portion of the occipital-side temporal region. The cable support section T3L3 is not necessarily configured as described above and may be configured to support the cable CB outside the mounting member T3L. Instead, the mounting member T3L may have no cable support section.

Further, the mounting members T3R and T3L are made of a resin, such as urethane, in the above description. Instead, the mounting members T3R and T3L may be made of any other material that is flexible enough to allow the end sections T3R2 and T3L2 to approach and separate away from each other in the state in which the mounting members T3R and T3L are disposed along the head.

Variation 2 of Mounting Member

Figure 21:
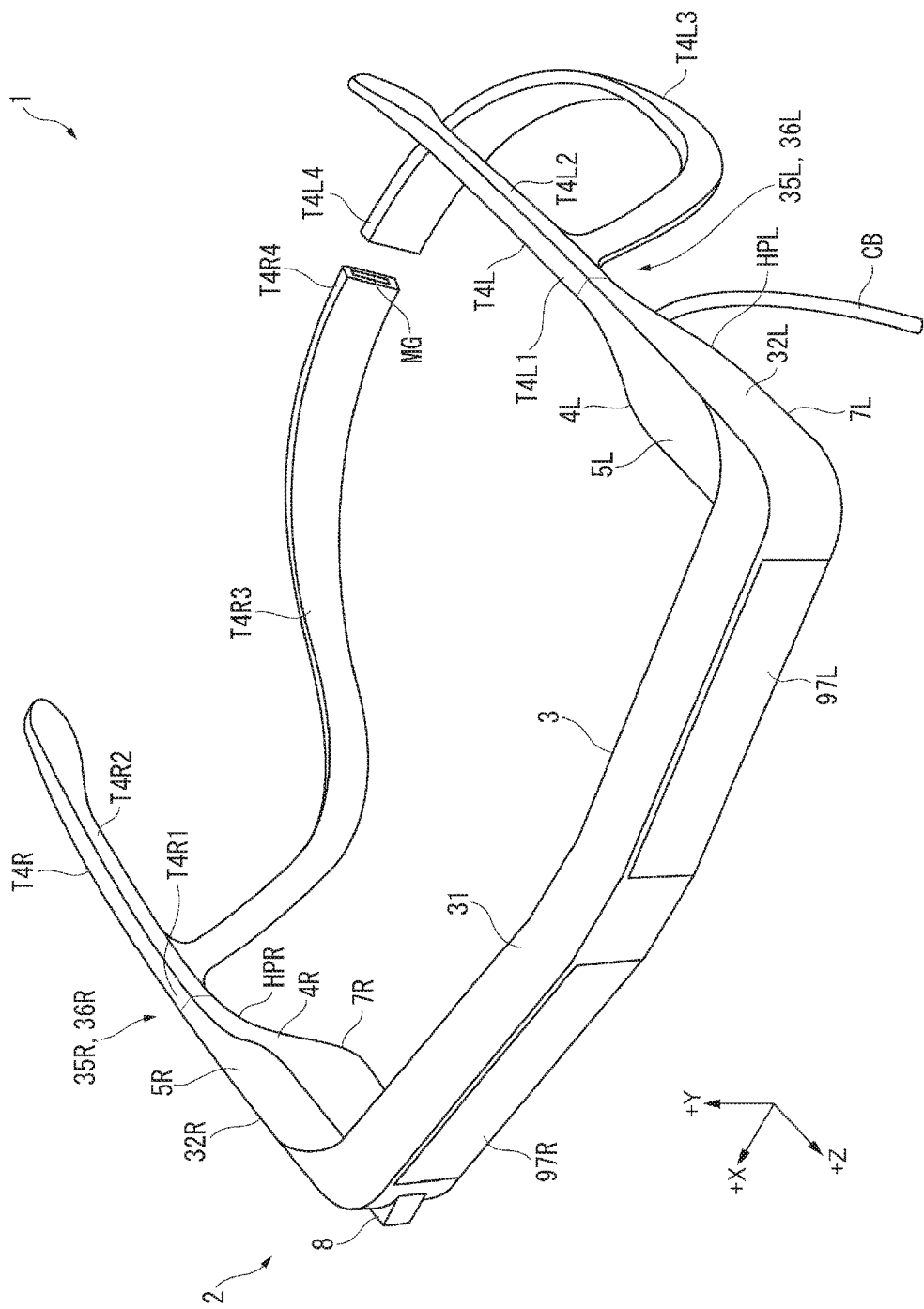
FIG. 21 is a perspective view showing the frame body and mounting members in the embodiment.
Figure 22:
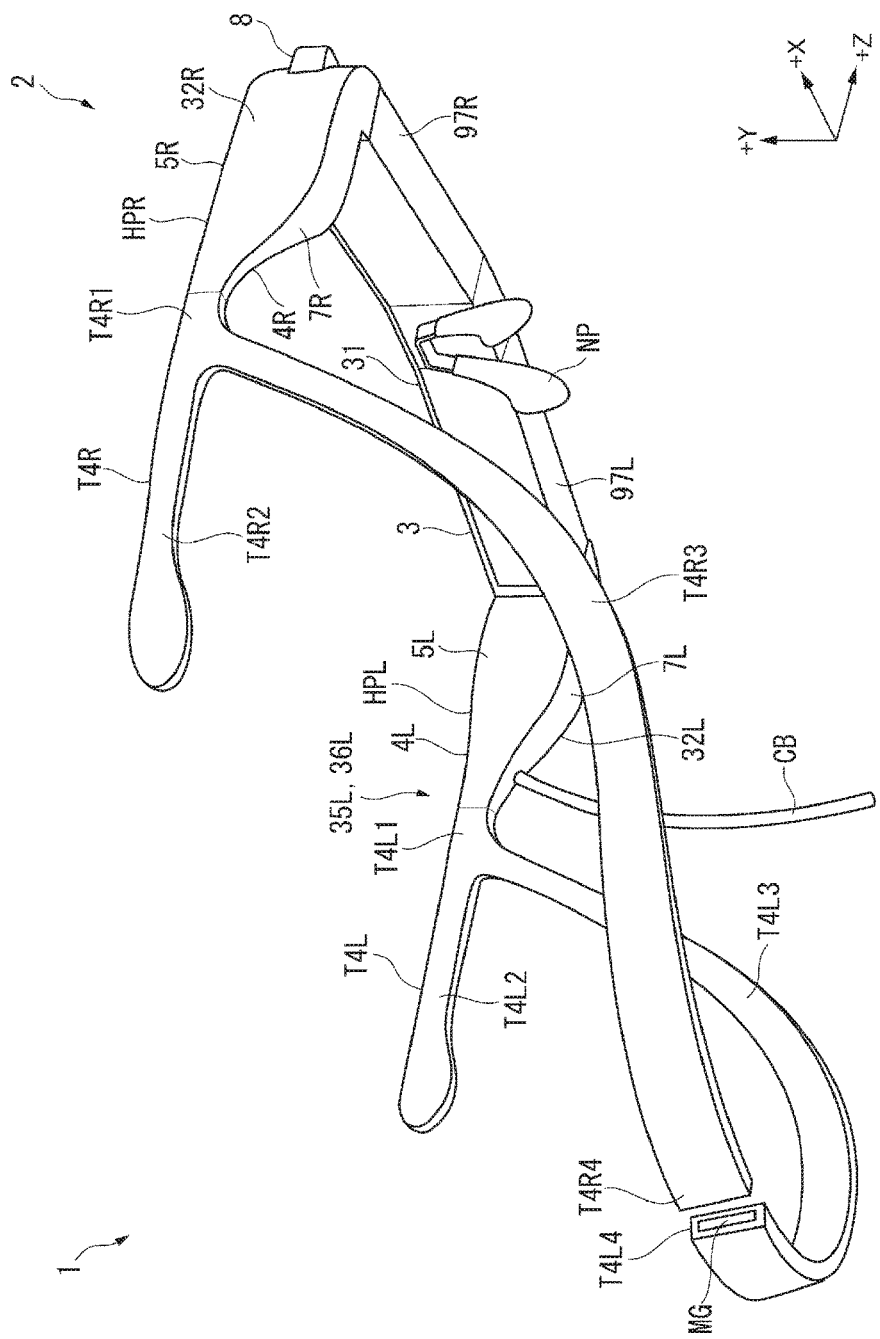
FIG. 22 is a perspective view showing the frame body and the mounting members in the embodiment.

FIGS. 21 and 22 are perspective views of the frame body 3 and mounting members T4R and T4L viewed from the front and rear sides and from above and below, respectively.

The mounting members T4R and T4L shown in FIGS. 21 and 22 can be attached to the frame body 3.

Front-side end sections T4R1 and T4L1 of the mounting members T4R and T4L are connected to the rear-side end sections of the accommodation sections HPR and HPL, respectively. Out of the front-side end sections, the end section T4R1 is attached to the support section 35R or 36R, as the mounting member T3R is, and the end section T4L1 is attached to the support section 35L or 36L, as the mounting member T3L is.

Out of the mounting members T4R and T4L, the mounting member T4R has a configuration formed, for example, of the mounting member T1R or T2R combined with the mounting member T3R described above.

Specifically, the mounting member T4R has an arm section T4R2, which extends from the end section T4R1 along the extending direction of the side surface section 32R from the front section 31 of the frame body 3 and can be placed on the user's ear, and a band section T4R3, which extends downward and toward the rear side from a position in the vicinity of the end section T4R1 of the arm section T4R2. The magnet MG described above is provided in an end section T4R4 of the band section T4R3, which is an end section opposite the end section of the band section T4R3 on the side facing the arm section T4R2.

On the other hand, the mounting member T4L also has a configuration formed, for example, of the mounting member T1L or T2L combined with the mounting member T3L described above and has an arm section T4L2, which has the same configuration as that of the arm section T4R2, a band section T4L3, which has the same configuration as that of the band section T4R3, and an end section T4L4, in which the magnet MG is provided. The band sections T4R3 and T4L3 do not necessarily have the same length and may, for example, have lengths that allow the band sections T4R3 and T4L3 to be connected to each other in the vicinity of one of the user's temporal regions, as in the case of the lengths of the mounting members T3R and T3L described above.

To mount the thus configured mounting members T4R and T4L on the user's head, after the arm sections T4R2 and T4L2 are placed on the ears, and the band sections T4R3 and T4L3 are so placed as to follow the temporal regions and the occipital, the end sections T4R4 and the T4L4 are connected to each other via the magnets MG described above.

The arm sections T4R2 and T4L2, which are portions placed on the ears to support the HMD 1, need to have a certain degree of rigidity, whereas the band sections T4R3 and T4L3, which need to follow the head, need to have a certain degree of flexibility. To this end, in the present embodiment, the arm sections T4R2 and T4L2 and the band sections T4R3 and T4L3 are made of difference materials. The mounting member T4R is, however, not necessarily configured as described above and may be a unitary part formed of the arm section T4R2 and the band section T4R3 made of the same material. The same holds true for the mounting member T4L.

Variation 3 of Mounting Member

Figure 23:
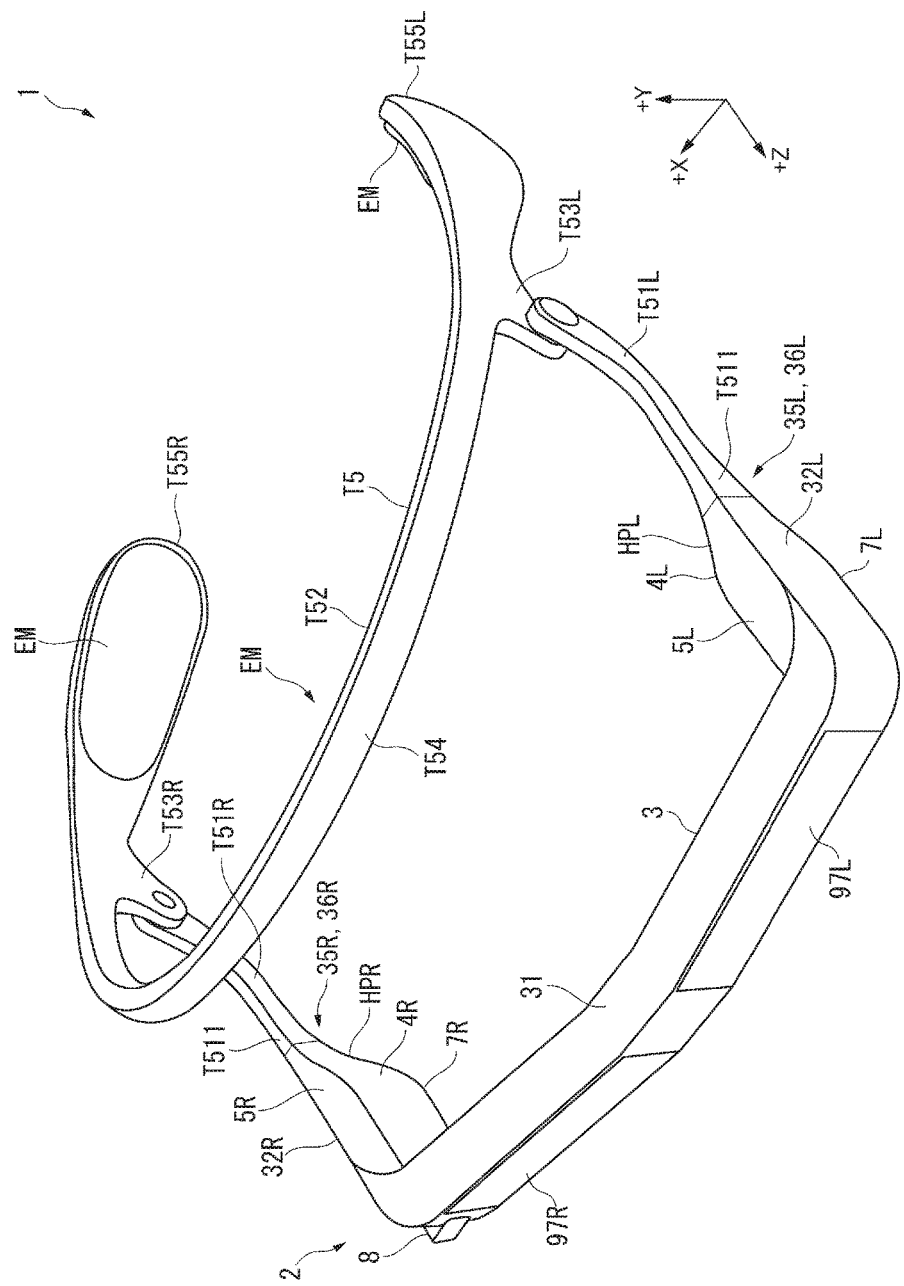
FIG. 23 is a perspective view showing the frame body and a mounting member in the embodiment.
Figure 24:
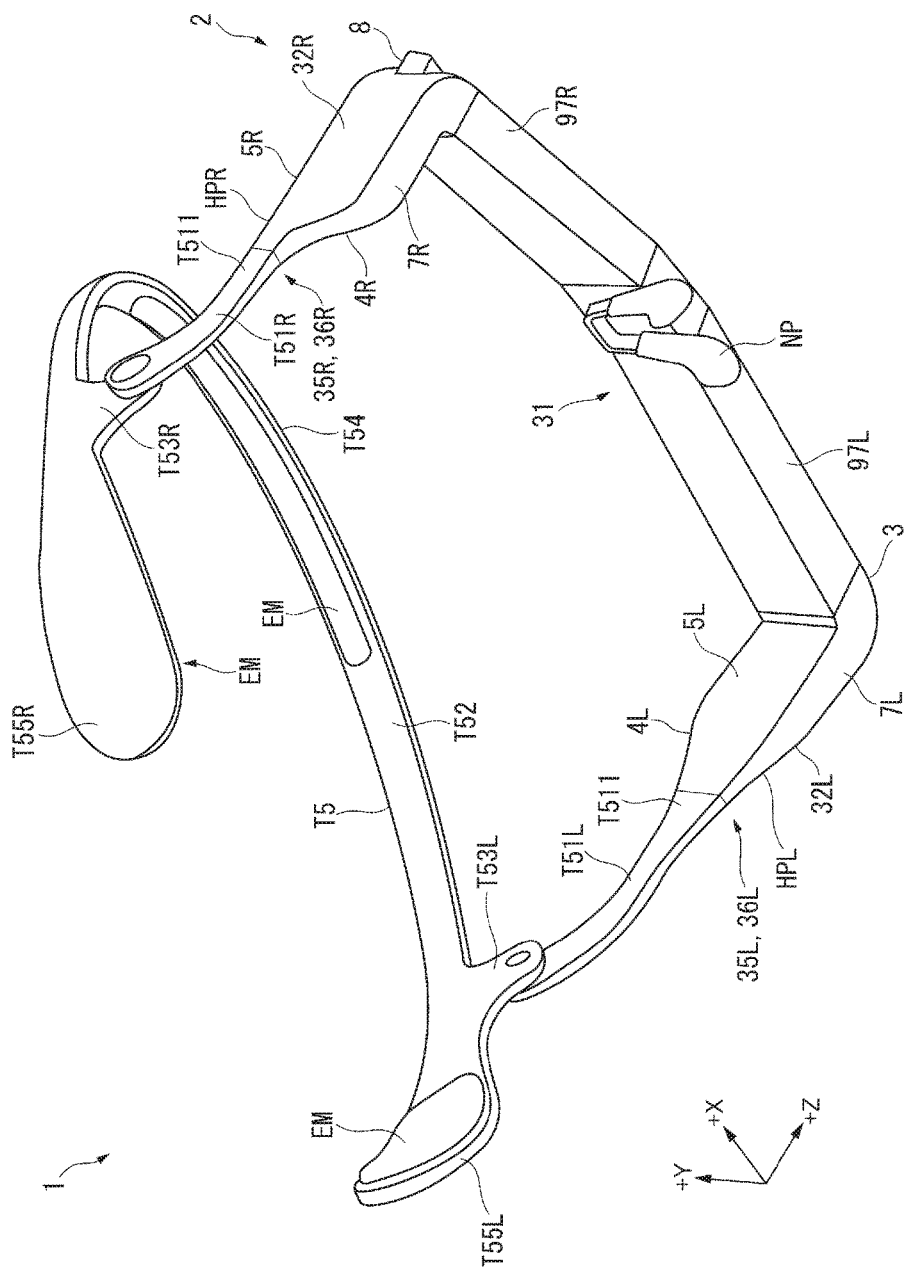
FIG. 24 is a perspective view showing the frame body and the mounting member in the embodiment.

FIGS. 23 and 24 are perspective views of the frame body 3 and a mounting member T5 viewed from the front and rear sides and from above and below, respectively.

The mounting member T5 shown in FIGS. 23 and 24 can be attached to the frame body 3.

The mounting member T5 is a mounting member that mounts the frame body 3 on the user's head. The mounting member T5 has arm sections T51R and T51L, which are located on the right and left sides, and a sandwiching section T52, which pivotally supports the arm sections T51R and T51L and sandwich the head.

A front-side end section T511 of the right arm section T51R is attached to the support section 35R or 36R, and a front-side end section T511 of the left arm section T51L is attached to the support section 35L or 36L. The arm sections T51R and T51L can be placed on the user's ears when the HMD 1 is mounted on the head, as the arm sections T4R2 and T4L2 can.

The sandwiching section T52 is a head band section that is formed in an arcuate shape surrounding the user's head except a roughly central portion of the occipital and sandwiches the head, and the sandwiching section T52 is flexible enough to be capable of increasing the dimension between end sections T55R and T55L, which will be described later. The sandwiching section T52 has linkage sections T53R and T53L, which are located at portions according to occipital-side positions in the user's temporal regions and to which the arm sections T51R and T51L are pivotally linked. At the linkage sections T53R and T53L, the arm sections T51R and T51L are integrated with the sandwiching section T52.

A front-side portion T54 of the thus configured sandwiching section T52 faces the user's forehead, and rear-side right and left end sections T55R, T55L face portions that sandwich the occipital external protuberance of the occipital from right and left. An elastic member EM, such as a cushion, which comes into contact with the user's head, is provided on the inner surface of each of the portion T54 and the end sections T55R and T55L.

To mount the HMD 1 having the thus configured mounting member T5 on the head, the mounting member T5 is so mounted on the head that the sandwiching section T52 is put on the head. The mounting process includes placing the arm sections T51R and T51L described above on the right and left ears, causing the elastic member EM on the portion T54 to come into contact with the forehead, and causing the elastic members EM on the end sections T55R and T55L to come into contact with portions on the right and left of the occipital external protuberance. In this state, restoration force produced by the sandwiching section T52 allows the end sections T55R and T55L and the portion T54 to sandwich the head. The HMD 1 can thus be mounted on the head.

The arm sections T51R, T51L and the sandwiching section T52 may be made of different materials or the same material, as in the case of the mounting members T4R and T4L described above.

Effects of Embodiment

The HMD 1 according to the present embodiment described above can provide the following effects.

In accordance with the structure, weight, and other factors of the mounting member attached to the frame body 3 among the mounting members T1R, T2R, T3R, T4R, and T5, the support section on which the mounting member is mounted can be selected from the support section 35R as the first support section and the support section 36R as the second support section for use. Different mounting members can therefore be attached to the frame body 3 in a stable manner. In addition to the above, since a plurality of types of mounting member can be attached to the frame body 3 for use, the versatility of the HMD 1 can be enhanced.

Further, in accordance with the shape, configuration, and other factors of a mounting member, a support section to which the mounting member is relatively readily attached is selected from the support sections 35R and 36R for use, whereby the mounting member can be readily attached to the frame body 3. Therefore, in this case, the attachment of the mounting member can be simplified.

The support sections 35L and 36L, to which the mounting members T1L, T2L, T3L, T4L, and T5 can be attached, can also provide the same effects.

The support sections 35R and 35L pivotally support the mounting members T1R and T1L, and the mounting members T2R and T2L are fixed to the support sections 36R and 36L. The configuration allows a mounting member according to an application of the HMD 1 as well as the configuration of the mounting member can be attached to a support section according to the application. The versatility of the HMD 1 can therefore be enhanced.

The support section 36R is located in the vicinity of the support section 35R. The size of the portion of the frame body 3 where the support sections 35R and 35L are disposed can therefore be reduced. The size of the HMD 1 can therefore be reduced. The same effect can be provided by the configuration in which the support section 36L is located in the vicinity of the support section 35L.

The support sections 35R and 35L support the mounting members T1R and T1L when the screw SC as the first attaching section is fixed along the first direction (−Y direction), and the support sections 36R and 36L support the mounting members T2R and T2L when the screws SC1 and SC2 as the second attaching section are fixed along the second direction (+Z direction) different from the first direction. As a result, one of the screw SC and the screws SC1, SC2, which are fixed along the first direction and the second direction different from each other, allows the corresponding support sections to support the mounting members. Therefore, in accordance with the structure and other factors of mounting members to be used, the mounting members can be reliably attached to the support sections 35R and 35L or the support sections 36R and 36L.

The support sections that form the support section 36R are located in the frame body 3 and in positions that sandwich the support section 35R in the upward/downward direction perpendicular to the extending direction of the mounting members T1R and T2R from the frame body 3. As a result, the support sections 35R and 36R can be closely arranged in the frame body 3. The size of the portion of the frame body 3 (accommodation section HPR) where the support sections 35R and 36R are located can therefore be reliably reduced. The size of the HMD 1 can therefore be reduced.

If the support section 36R, to which the mounting member T2R is attached with a screw inserted along the direction (second direction) opposite the extending direction described above, is formed of one support section, the mounting member T2R is likely to undesirably pivot around the extending direction when the mounting member T2R is attached to the frame body 3. In contrast, the support section 36R is formed of at least two support sections, and the screws SC1 and SC2 are fixed to the two support sections, whereby pivotal motion of the mounting member T2R can be avoided. The mounting member T2R can therefore be attached in a more stable manner.

The same effect can be provided by the support section 36L, to which the mounting member T2L is attached.

The frame 2 includes the case member 4R, which is attached to the side surface section 32R of the frame body 3. The case member 4R has the upper case 5R, which is located in an upper position, and the lower case 7R, which is located in a lower position and combined with the upper case 5R. The screw SC1 as the second attaching section fixes the upper case 5R and the mounting member T2R to the support section 36R (case fixing section 3241). Similarly, the screw SC2 as the second attaching section fixes the upper case 5R, the lower case 7R, and the mounting member T2R to the support section 36R (case fixing section 3251). The configuration eliminates the necessity to separately provide a configuration for attaching the upper case 5R and the lower case 7R to the frame body 3, and the support section 36R can be used to attach the upper case 5R and the lower case 7R to the frame body 3 (side surface section 32R). Complication of the configuration of the frame body 3 can therefore be avoided.

The same effect can be provided by the support section 36L, which is configured to include the case fixing sections 3241 and 3251 of the side surface section 32L.

The screw SC, which serves as a fastener and is the first attaching section, is inserted through the hole 351 of the mounting member T1R in the downward direction (first direction) perpendicular to the extending direction described above to attach the mounting member T1R to the support section 35R. The screws SC1 and SC2, which serve as fasteners and are the second attaching section, are inserted through the holes T22 and T24 of the mounting member T2R along the extending direction of the mounting member T2R from the frame body 3 in the direction (second direction) opposite the extending direction to attach the mounting member T2R to the support section 36R. The configuration allows the screw SC to reliably attach the mounting member T1R to the support section 35R and allows the screws SC1 and SC2 to attach the mounting member T2R to the support section 36R. The mounting members T1R and T2R can therefore be reliably attached to the frame body 3 in a simple configuration.

The same effect can be provided by the support sections 35L and 36L, to which the mounting members T1L and T2L are attached with screws, as in the case of the mounting members T1R and T2R.

The support section 36R (case fixing sections 3241 and 3251), to which the screws SC1 and SC2 inserted through the mounting member T2R and the case member 4R (upper case 5R and lower case 7R) along the extending direction of the mounting member T2R from the frame body 3 are attached, is located in the case member 4R. As a result, the support section 36R is less visible, and not only the mounting member T2R but also the case member 4R can be fixed to the frame body 3 via the support section 36R, as described above. The frame body 3 therefore needs to be separately provided with no configuration for fixing the case member 4R to the frame body 3, whereby the configuration of the frame body 3 can be simplified.

Further, since the direction in which the screw SC, which attaches the mounting member T1R to the support section 35R, is inserted into the mounting member T1R coincides with the upward/downward direction along the direction perpendicular to the extending direction described above, the mounting member T1R can be so attached to the support section 35R as to be allowed to pivot around the insertion direction. Therefore, in a case where the HMD 1 is not used, the mounting member T1R can be folded toward the user side. The HMD 1 can therefore be readily handled.

The same effect described above can be provided by the support section 35L, to which the mounting member T1L is attached with the screw SC, and the support section 36L, to which the mounting member T2L and the case member 4L are attached with the screws SC1 and SC2.

Variations of Embodiment

The invention is not limited to the embodiment described above, and changes, improvements, and other modifications to the extent that the advantage of the invention is achieved fall within the scope of the invention.

The mounting members T1R and T2R are attached to the support sections 35R and 36R with the screws SC, SC1, and SC2 as fasteners, but not necessarily, and the mounting members may be attached to the support sections via other fasteners or an attaching section with which each of the mounting members is provided. For example, the mounting member T1R may have an attaching section (first attaching section) that is inserted into the hole 351 of the support section 35R and attached thereto, and the mounting member T2R may have an attaching section (second attaching section) that is inserted into and attached to the support section 36R (case fixing sections 3241 and 3251). The same holds true for the support sections 35L and 36L and the mounting members T1L and T2L, and the same also holds true for the other mounting members T3R, T3L, T4R, T4L and T5.

In the HMD 1, the following mounting members are presented by way of example: the mounting members T1R, T1L, T2R, and T2L, each of which has a glasses-temple-like configuration; the mounting member T3R and T3L, each of which has a band-like configuration; the mounting members T4R and T4L, each of which has a configuration formed, for example, of temples combined with bands; and the mounting member T5, which has a headband-like configuration, but not necessarily, and a mounting member may have an arbitrary configuration and shape that allow the mounting member to be attached to the frame body 3 and allow the HMD 1 to be mounted on the user's head.

The support section 36R is located in the vicinity of the support section 35R. Further, the support sections that form the support section 36R are provided in the positions that sandwich the support section 35R from above and below. The support sections are not necessarily arranged as described above, and the arrangement of the support sections 35R and 36R can be changed as appropriate. That is, the support sections 35R and 36R may be so arranged as to be separate away from each other, or the support sections that form the support section 36R may be provided in positions that sandwich the support section 35R from right and left. Further, the support section 36R is configured to have the case fixing sections 3241 and 3251, into which the screws SC1 and SC2, which fix the side surface section 32R and the case member 4R to each other, are screwed, but not necessarily, and the support section 36R may be provided separately from the case fixing sections 3241 and 3251. Further, the number of support sections that form the support section 36R, to which the screws SC1 and SC2 or other fasteners that fix the mounting member are attached, may be one or three or more. In this case, the support sections that form the support section 36R may be so arranged as to surround the support section 35R, two of the plurality of support sections that form the support section 36R may be so arranged as to sandwich the support section 35R, or the support section 36R may be arranged in a position different from the position of the support section 35R.

Further, the support sections 35R and 36R are not necessarily configured as described above and can be changed as appropriate. The same holds true for the support sections 35L and 36L.

The frame 2 has the case member 4R, which is attached to the side surface section 32R so that the accommodation section HPR is formed, but not necessarily, and the case member 4R may be omitted. Further, the case member 4R has the substrate holder 6R as well as the upper case 5R and the lower case 7R, but not necessarily, and the substrate holder 6R may be omitted. Further, the upper case 5R and the lower case 7R are attached to the side surface section 32R via the support section 36R, to which the mounting member T2R can be attached, but not necessarily, and a configuration for attaching the case member 4R to the frame body 3 may be separately provided.

The same holds true for the case member 4L and the support section 36L.

In the HMD 1 described above, the mounting members T1R and T1L are attached to the support sections 35R and 35L, and the mounting members T2R and T2L are attached to the support sections 36R and 36L. The mounting members T3R, T3L, T4R, T4L, and T5 are attached to the support sections 35R and 35L or the support sections 36R and 36L, but not necessarily, and at least one of the right support sections 35R and 36R may be used to attach one mounting member to the frame body 3, and at least one of the left support sections 35L and 36L may be used to attach one mounting member to the frame body 3.

For example, in a case where right and left first support sections having the same configurations as those of the support sections 35R and 35L and right and left second support sections having the same configurations as those the support sections 36R and 36L are so arranged as to be separate away from each other, mounting members having the same arm sections as the arm sections T4R2 and T4L2 of the mounting members T4R and T4L shown in FIGS. 21 and 22 may be attached to the first support sections, and mounting members having the same band sections as the band sections T4R3 and T4L3 may be attached to the second support sections. Further, the mounting members mounted by using the first support sections may be a single mounting member, and the mounting members mounted by using the second support sections may be a single mounting member, as in the case of the mounting member T5. That is, the support sections 35R and 35L may support a mounting member, and the support sections 36R and 36L may support a mounting member. In this case, in the example described above, the mounting members attached to the first support sections can be pivotally supported.

Further, mounting members are attached to one of the right support sections 35R and 36R and one of the left support sections 35L and 36L, but not necessarily, and a mounting member may be attached only to a right support section or a left support section.

In the HMD 1 described above, the support sections 35R and 35L as the first support section and the support sections 36R and 36L as the second support section support mounting members with the mounting members fixed with screws fixed along different directions. The mounting members T1R and T1L are pivotally supported by the support sections 35R and 35L, and the mounting members T2R and T2L are fixed to the support sections 36R and 36L, but not necessarily, and the first support sections and the second support sections are arbitrarily configured as long as the first support sections and the second support sections support mounting members in different schemes. Examples of the support scheme may include not only the type of the attaching tool that attaches a mounting member to a support section, the direction in which a mounting member is attached to a support section, and the method for attaching a mounting member to a support section but also the state in which a mounting member is attached to a support section and the state in which a mounting member is supported by a support section. Examples of the attachment state and the support state may include a state in which a mounting member is so supported by one support section as to be allowed to pivot, slide, swing, or otherwise move and a mounting member is so supported by the other support section as to be immobile. That is, the configurations of the first support section and the second support section and the support schemes employed by the support sections may be arbitrarily determined as long as the support scheme in accordance with which the first support sections support mounting members differs from the support scheme in accordance with which the second support sections support mounting members.

In the HMD 1 described above, one imaging device 8 is provided in the right end section 31R of the frame body 3, but not necessarily, and the position of the imaging device 8 and the number of imaging devices 8 can be changed as appropriate. For example, the imaging device 8 may be provided in the left end section 31L or may be provided in each of the left end section 31L and the right end section 31R. Further, no imaging device may be provided in the right end section 31R or the left end section 31L, but at least one imaging device may be provided, for example, at the center of the frame body 3, in the side surface section 32R or 32L, or the case member 4R or 4L.

In the HMD 1 described above, the light guide members 97R and 97L, which guide the image light projected from the image projection sections 91 accommodated in the accommodation sections HPR and HPL to the user's eyes, are employed as the display section, but not necessarily, and the display section may be a display panel, such as a liquid crystal panel and an organic EL panel. That is, the invention is also applicable to a closed-type HMD, and as long as an image can be so displayed as to be visually recognizable by the user, the display scheme of the image may be arbitrarily determined. Further, in place of the light guide members 97R and 97L, reflection members that reflect images projected by the image projection sections 91 toward the user's eyes may be employed as the display section.

The members accommodated in each of the accommodation sections HPR and HPL do not necessarily include both the image projection section 91 and the control section 96 and may include only one of the image projection section 91 and the control section 96. The members may further include a control circuit, a power supply, and other members necessary for the action of the display section.

Further, in the HMD 1, the optical devices 9R and 9L, which include the light guide members 97R and 97L arranged in accordance with the user's eyes, are provided in correspondence with the user's right and left eyes, but not necessarily, and an HMD provided with only one of the optical devices 9R and 9L may be configured.

In the HMD 1 described above, the control section 96, which is provided in each of the optical devices 9R and 9L, controls the action of the image projection section 91, that is, image formation performed by the image formation device 92, but not necessarily. For example, the control section 96 provided in the optical device 9R described above may control the action of the imaging device 8 (including light-up action of light emitting section) or may control charge of a battery held by the frame 2 by using externally supplied electric power. The control section 96 may further control communication with an image display apparatus of another HMD 1 or any other apparatus or with an image supply apparatus or any other electronic apparatus. That is, the process carried out by the control section 96 accommodated in each of the accommodation sections HPR and HPL may be other processes. In this case, a control device that controls the action of the image formation device 92 may be provided at a separate location.

Further, the control section 96 is not limited to a printed board and may be a flexible printed board or may be a control unit having a computation processing circuit or any other circuit element. That is, the control section according to an aspect of the invention may be arbitrarily configured as long as the control section performs predetermined control.

The entire disclosure of Japanese Patent Application No. 2016-026429, filed Feb. 15, 2016 is expressly incorporated by reference herein.

What is claimed is:

1. A head mounted image display apparatus comprising:
a display section that displays an image;
a frame member that supports the display section; and
a mounting member that is supported by one end of the frame member and allows the frame member to be mounted on a user's head,
wherein the frame member has, at the one end,
a first support section having a first support scheme,
a second support section having a second support scheme different from the first support scheme, and the mounting member is supported by one of the first support section or the second support section.

2. The head mounted image display apparatus according to claim 1,
wherein the first support scheme is a movable support scheme, and
the second support scheme is a fixed support scheme.

3. The head mounted image display apparatus according to claim 1,
wherein the second support section is located in a position close to the first support section.

4. The head mounted image display apparatus according to claim 1,
wherein the first support section supports the mounting member with a first attaching section that attaches the mounting member fixed along a first direction, and
the second support sections support the mounting member with a second attaching section that attaches the mounting member fixed along a second direction different from the first direction.

5. The head mounted image display apparatus according to claim 4,
wherein the second direction is a direction along an extending direction of the mounting member attached to the frame member from the frame member, and
support sections that form the second support section are located in the frame member and in positions that sandwich the first support section in a direction perpendicular to the extending direction.

6. The head mounted image display apparatus according to claim 4,
further comprising a case member attached to the one end of the frame member,
wherein the case member includes
an upper case located in an upper position, and
a lower case located in a lower position and combined with the upper case, and
the second attaching section attaches the mounting member and at least one of the upper case and the lower case to the second support section.

7. The head mounted image display apparatus according to claim 4,
wherein the first attaching section is a fastener inserted through the mounting member along the first direction to attach the mounting member to the first support section, and
the second attaching section is a fastener inserted through the mounting member along the second direction to attach the mounting member to the second support section.

8. The head mounted image display apparatus according to claim 4,
further comprising a case member attached to the one end of the frame member,
wherein the first attaching section is a fastener inserted through the mounting member along a direction perpendicular to an extending direction of the mounting member attached to the frame member from the frame member to attach the mounting member to the first support section, the second support section is located inside the case member, and the second attaching section is a fastener inserted through the mounting member and the case member along the extending direction to attach the mounting member and the case member to the second support section.

* * * * *